United States Patent
DeBaker et al.

(10) Patent No.: US 11,299,225 B1
(45) Date of Patent: Apr. 12, 2022

(54) DUAL LEVEL BICYCLE RACK

(71) Applicant: Saris Cycling Group, Inc., Madison, WI (US)

(72) Inventors: Chad M. DeBaker, Minneapolis, MN (US); Michael E. Brauer, Minneapolis, MN (US); Adam Tieri, Apple Valley, MN (US)

(73) Assignee: Saris Cycling Group, Inc., Madison, WI (US)

( * ) Notice: Subject to any disclaimer, the term of this patent is extended or adjusted under 35 U.S.C. 154(b) by 0 days.

(21) Appl. No.: 17/069,203

(22) Filed: Oct. 13, 2020

(51) Int. Cl.
*B62H 3/04* (2006.01)
*B62H 3/08* (2006.01)

(52) U.S. Cl.
CPC .............. *B62H 3/04* (2013.01); *B62H 3/08* (2013.01)

(58) Field of Classification Search
CPC ... B62H 3/08; B62H 3/04; B62H 3/12; B62H 3/02; Y10T 70/5872; Y10T 70/5876; Y10T 70/5881; G07F 17/10
See application file for complete search history.

(56) References Cited

U.S. PATENT DOCUMENTS

| | | | |
|---|---|---|---|
| 557,900 | A | 4/1896 | Shannon |
| 565,057 | A | 8/1896 | Westphal |
| 636,324 | A | 11/1899 | Ehrenberg |
| 639,517 | A | 12/1899 | Butcher |
| 639,991 | A | 12/1899 | Jewell |
| 650,663 | A | 5/1900 | Whitcher |
| 2,460,945 | A | 2/1949 | Nighthart |
| 3,603,459 | A | 9/1971 | Erb |
| 3,655,082 | A | 4/1972 | Garrett |
| 3,682,523 | A | 8/1972 | Esposito |
| 3,770,133 | A | 11/1973 | Kolker |

(Continued)

FOREIGN PATENT DOCUMENTS

| CN | 2223934 | 4/1996 |
|---|---|---|
| CN | 2329578 | 7/1999 |

(Continued)

OTHER PUBLICATIONS

"Two-tier parking DoubleDeck Rack", www.bikeparking.com/doubledeckerrack/index.html, printed from internet May 9, 2005.

(Continued)

*Primary Examiner* — Ko H Chan
(74) *Attorney, Agent, or Firm* — Boyle Fredrickson S.C.

(57) ABSTRACT

A bicycle parking rack includes a tray having a stationary wheel engagement structure that engages a bicycle wheel on one side of the center of the wheel. A movable wheel engagement member is arranged to engage the bicycle on the other side of the center of the wheel, to apply a clamping force on the wheel and to maintain the the bicycle in an upright position. The rack may include lower parking stations in which at each lower station the front bicycle wheel is clamped between the wheel engagement structure and the movable wheel engagement member, and upper parking stations in which at each station the rear wheel engages the wheel engagement structure and the front wheel is engaged with the wheel engagement member. At each upper station, the tray is movable between a loading position and a storage position via an elevated track and trolley arrangement.

13 Claims, 31 Drawing Sheets

(56) References Cited

U.S. PATENT DOCUMENTS

| | | | | |
|---|---|---|---|---|
| 3,843,001 A | * | 10/1974 | Willis | B60P 3/122 414/462 |
| 3,861,533 A | | 1/1975 | Radek | |
| 3,872,972 A | | 3/1975 | Cummins et al. | |
| 3,883,002 A | | 3/1975 | Moore | |
| 3,912,139 A | | 10/1975 | Bowman | |
| 3,924,751 A | | 12/1975 | Ballenger | |
| 3,973,812 A | | 8/1976 | Poltorak | |
| 3,994,425 A | | 11/1976 | Graber | |
| 4,015,718 A | | 4/1977 | Bernard | |
| 4,016,686 A | | 4/1977 | Hartger et al. | |
| 4,171,077 A | | 10/1979 | Richard, Jr. | |
| 4,213,729 A | | 7/1980 | Cowles et al. | |
| 4,306,660 A | | 12/1981 | Livingston | |
| 4,318,501 A | | 3/1982 | Graber | |
| 4,392,572 A | | 7/1983 | Bernard | |
| 4,416,379 A | | 11/1983 | Graber | |
| 4,555,029 A | | 11/1985 | Fiol | |
| 4,630,990 A | | 12/1986 | Whiting | |
| 4,815,638 A | | 3/1989 | Hutyra | |
| 5,052,605 A | | 10/1991 | Johansson | |
| 5,238,125 A | | 8/1993 | Smith | |
| 5,377,886 A | | 1/1995 | Sickler | |
| 5,435,475 A | | 7/1995 | Hudson et al. | |
| D361,539 S | | 8/1995 | Matlaga | |
| D361,742 S | | 8/1995 | Matlaga | |
| 5,449,074 A | | 9/1995 | Paulson et al. | |
| 5,462,398 A | * | 10/1995 | Hymer | B60P 3/07 414/462 |
| 5,492,228 A | | 2/1996 | Botkin | |
| 5,505,579 A | | 4/1996 | Ray et al. | |
| 5,549,231 A | | 8/1996 | Fletcher et al. | |
| 5,632,591 A | | 5/1997 | Henriquez | |
| 5,642,820 A | | 7/1997 | Angeles | |
| 5,690,259 A | | 11/1997 | Montan | |
| 5,692,659 A | | 12/1997 | Reeves | |
| 5,730,577 A | | 3/1998 | Jones | |
| 5,749,474 A | | 5/1998 | Woodcock | |
| 5,772,048 A | | 6/1998 | Sopcisak | |
| 5,820,002 A | | 10/1998 | Allen | |
| 5,833,074 A | * | 11/1998 | Phillips | B62H 3/08 211/21 |
| 5,845,788 A | | 12/1998 | Robolin | |
| 5,917,407 A | | 6/1999 | Squire et al. | |
| 5,941,397 A | | 8/1999 | Buchanan et al. | |
| 5,984,111 A | | 11/1999 | Pennella | |
| 5,988,403 A | * | 11/1999 | Robideau | A47F 7/00 211/17 |
| 5,996,870 A | | 12/1999 | Shaver | |
| 6,082,552 A | | 7/2000 | Pollock et al. | |
| 6,095,344 A | | 8/2000 | White | |
| 6,149,039 A | | 11/2000 | Englander | |
| 6,161,702 A | | 12/2000 | Campbell | |
| 6,164,459 A | | 12/2000 | Liem | |
| 6,237,781 B1 | | 5/2001 | Dahl | |
| 6,336,562 B1 | | 1/2002 | Mori | |
| 6,419,096 B1 | | 7/2002 | Shepherd | |
| 6,427,888 B1 | | 8/2002 | Condon et al. | |
| 6,460,743 B2 | | 10/2002 | Edgerly et al. | |
| 6,561,398 B1 | | 5/2003 | Cole et al. | |
| 6,637,602 B2 | | 10/2003 | Dueck | |
| 6,698,994 B2 | | 3/2004 | Barrett | |
| 6,691,878 B1 | | 12/2004 | Ouitz | |
| 6,843,380 B1 | | 1/2005 | Fickett | |
| 6,866,175 B2 | | 3/2005 | Munoz et al. | |
| 6,868,998 B2 | | 3/2005 | Dean | |
| 6,968,986 B1 | | 11/2005 | Lloyd et al. | |
| 7,472,517 B2 | * | 1/2009 | Blume | B62H 3/00 211/20 |
| 7,481,027 B2 | | 1/2009 | Blume | |
| 7,694,830 B1 | | 4/2010 | Larson | |
| 7,784,622 B2 | * | 8/2010 | Bernard | B62H 3/08 211/20 |
| 7,922,009 B1 | * | 4/2011 | Larson | B62H 3/08 211/17 |
| 7,946,432 B1 | * | 5/2011 | Swanson | B62H 3/08 211/20 |
| 8,950,592 B1 | * | 2/2015 | Greenblatt | B62H 3/08 211/17 |
| 9,073,492 B1 | * | 7/2015 | Shen | B62H 3/04 |
| 9,610,993 B1 | | 4/2017 | Ho | |
| 9,650,092 B1 | * | 5/2017 | Tsai | B62H 3/06 |
| 2002/0175196 A1 | | 11/2002 | Johnson | |
| 2003/0071097 A1 | * | 4/2003 | Dean | B62H 3/08 224/319 |
| 2003/0141263 A1 | | 7/2003 | Dueck | |
| 2004/0050807 A1 | | 3/2004 | Cheng | |
| 2004/0060878 A1 | | 4/2004 | Ho | |
| 2004/0222172 A1 | | 11/2004 | Bleazard | |
| 2004/0226899 A1 | | 11/2004 | Ferron | |
| 2007/0221589 A1 | | 9/2007 | Bernard | |
| 2011/0220594 A1 | | 9/2011 | Chuang | |
| 2012/0125964 A1 | | 5/2012 | Sautter et al. | |
| 2020/0156724 A1 | * | 5/2020 | Kuschmeader | B62H 3/12 |

FOREIGN PATENT DOCUMENTS

| | | |
|---|---|---|
| CN | 2408009 | 11/2000 |
| CN | 208102169 U | 11/2018 |
| DE | 3238404 | 4/1984 |
| DE | 3520765 | 12/1986 |
| DE | 4126797 | 3/1992 |
| DE | 4210902 | 10/1993 |
| DE | 29605930 | 7/1996 |
| DE | 19547369 | 6/1997 |
| DE | 19629016 | 1/1998 |
| DE | 19831886 | 1/2000 |
| DE | 20005133 | 6/2000 |
| DE | 10013787 | 10/2001 |
| DE | 20209936 | 10/2002 |
| DE | 20211721 | 2/2003 |
| DE | 20308087 | 8/2003 |
| DE | 202004009779 | 2/2005 |
| EP | 939025 | 9/1999 |
| EP | 1462348 | 9/2004 |
| EP | 1479598 | 11/2004 |
| EP | 3216681 | 9/2017 |
| ES | 2020115 | 7/1991 |
| FR | 2587691 | 3/1987 |
| FR | 2606344 | 5/1988 |
| JP | 57058772 | 4/1982 |
| JP | 02161080 | 6/1990 |
| JP | 03273981 | 12/1991 |
| JP | 05213248 | 8/1993 |
| JP | 05221355 | 8/1993 |
| JP | 06107081 | 4/1994 |
| JP | 6199256 | 7/1994 |
| JP | 8277647 | 10/1996 |
| JP | 9112059 | 4/1997 |
| JP | 9310526 | 12/1997 |
| JP | 10250652 | 9/1998 |
| JP | 11180358 | 7/1999 |
| JP | 11247478 | 9/1999 |
| JP | 11301541 | 11/1999 |
| JP | 2000168649 | 6/2000 |
| JP | 2001010565 | 1/2001 |
| JP | 2001317226 | 11/2001 |
| JP | 2002112866 | 4/2002 |
| JP | 2002154466 | 5/2002 |
| JP | 2003341569 | 12/2003 |
| JP | 2013144874 | 7/2013 |
| KR | 100949578 | 3/2010 |
| KR | 100998713 | 12/2010 |
| KR | 20120020537 | 3/2012 |
| KR | 101655718 | 9/2016 |
| KR | 101984371 | 5/2019 |
| NL | 1011042 | 8/1999 |

(56) References Cited

FOREIGN PATENT DOCUMENTS

| WO | 9222718 | 12/1992 |
| WO | 2017039300 | 3/2017 |

OTHER PUBLICATIONS

"Cycle-Safe Introduces First Fiberglass Two-Tiered Bike Storage", Cycl-Safe, Inc., 478 Arrowhead SE, Grand Rapids, MI 49546, undated.

* cited by examiner

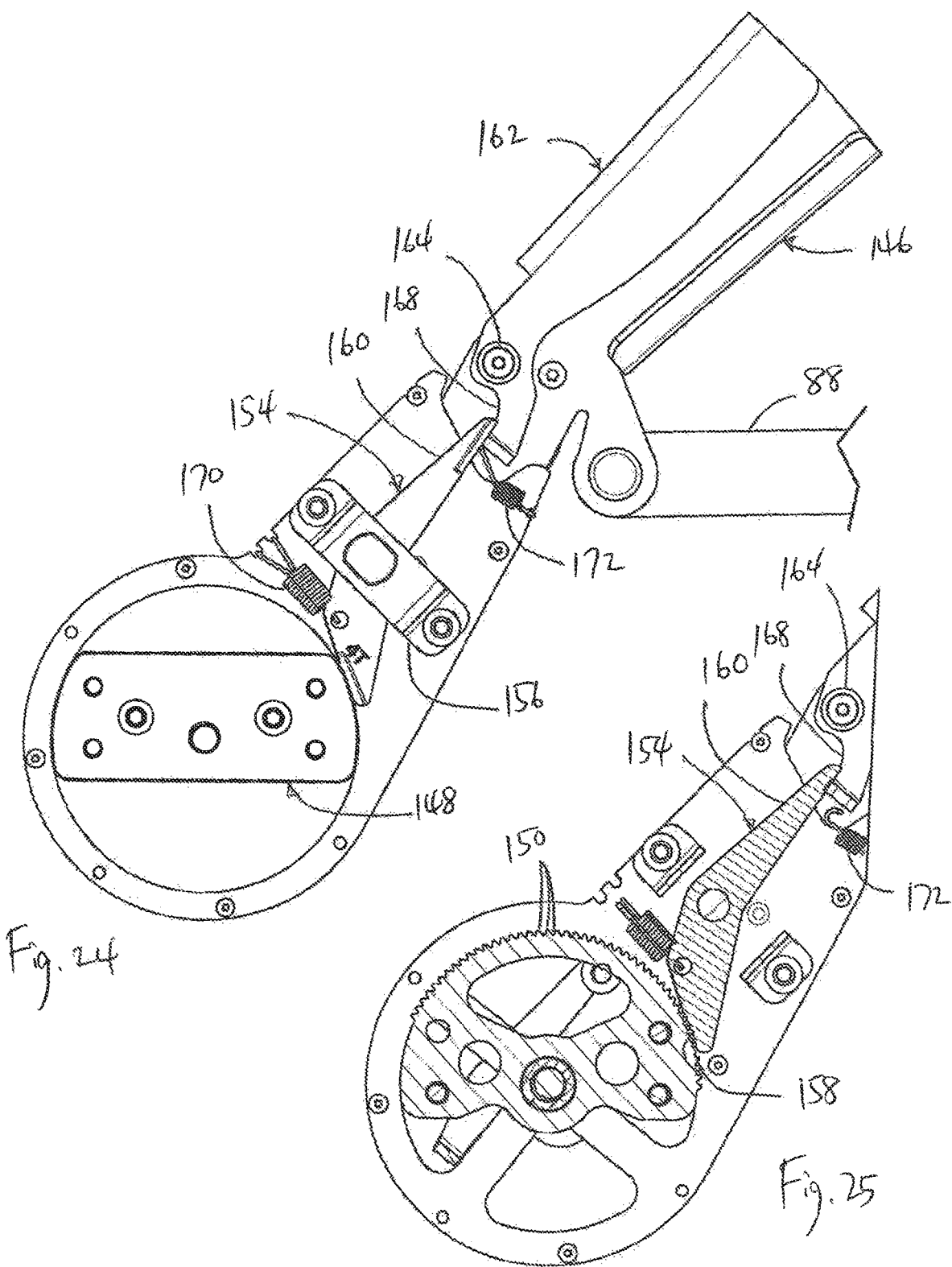

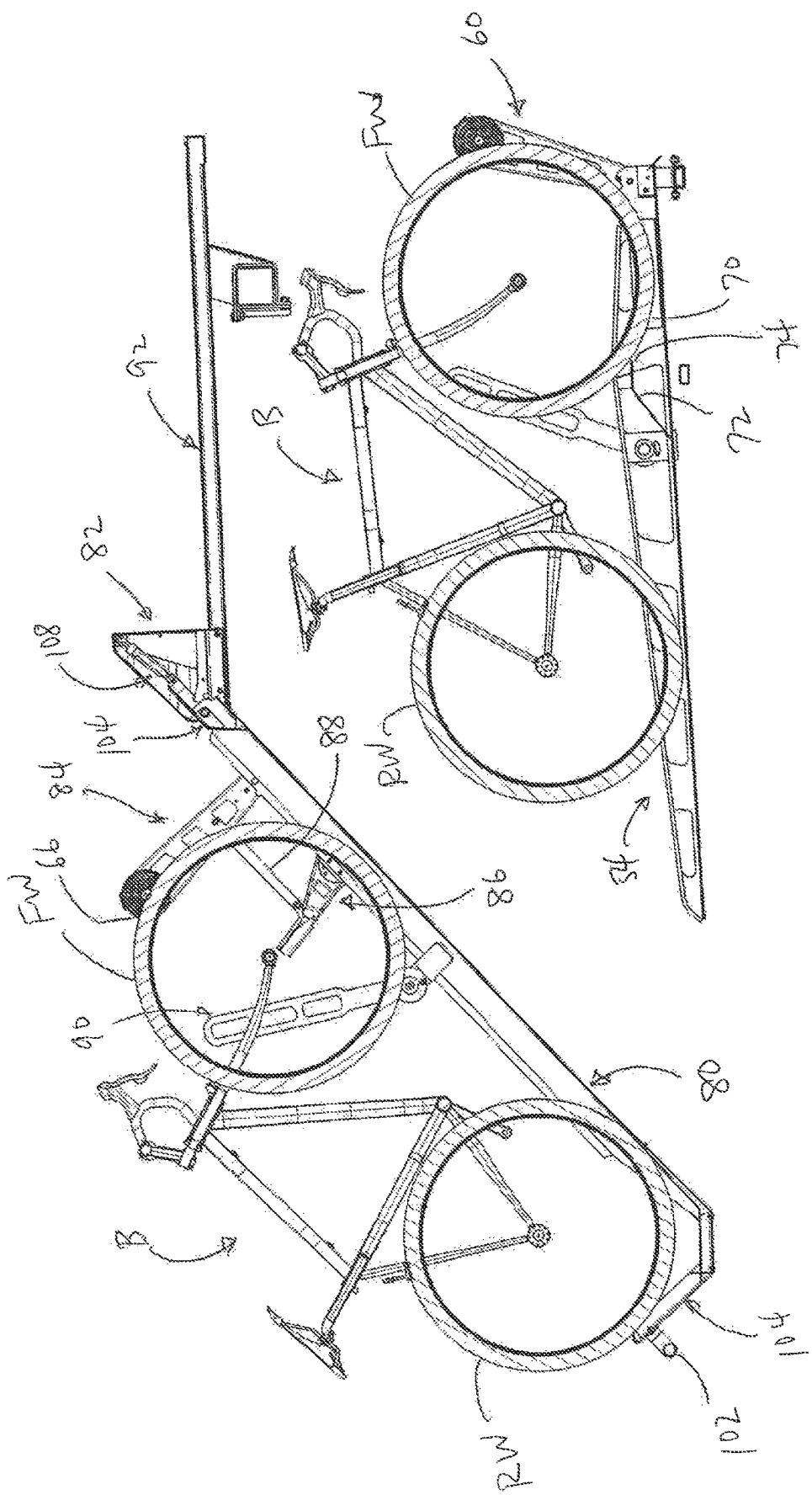

DUAL LEVEL BICYCLE RACK

BACKGROUND

This invention relates to a bicycle storage or parking arrangement, and more particularly to an arrangement for engaging a bicycle for storage or parking that is well suited for use in a dual level bicycle storage or parking arrangement having a series of lower bicycle storage or parking stations and a series of upper bicycle storage or parking stations.

Bicycle storage or parking racks of a variety of designs and configurations are known for storing or parking bicycles. A particular challenge in temporarily supporting bicycles, particularly in a parking environment, is providing a system that enables a user to quickly and easily take the steps necessary to support the bicycle in an upright position. This is especially the case in a high density bicycle storage or parking application in which bicycles are stored or parked at different levels, such as at ground level and at an elevation thereabove, to take advantage of available vertical space when available horizontal square footage is insufficient to accommodate the required bicycle parking.

SUMMARY OF THE INVENTION

According to a first aspect of the present invention, a bicycle parking arrangement, includes a tray configured to underlie at least a first wheel of a bicycle; a stationary wheel engagement structure associated with the tray that is arranged to engage one of the bicycle wheels on a first side of the center of the first wheel; and a movable wheel engagement member associated with the tray that is arranged to engage one of the bicycle wheels on a second side of the center of the first wheel. Engagement of the movable wheel engagement member with the second side of one of the wheels and engagement of the stationary wheel engagement structure with the first side of one of the wheels functions to apply a clamping force on at least one of the wheels therebetween to maintain the at least one wheel, and therefore the bicycle, in an upright position.

The stationary wheel engagement structure may be arranged to engage a first side of the center of a front one of the bicycle wheels and the movable wheel engagement member may be arranged to engaged a second side of the center of the front bicycle wheel. The stationary wheel engagement structure may be in the form of a ramp defining a front edge, wherein the front edge of the ramp engages a rear area of the front bicycle wheel at a location above a bottom of the front bicycle wheel and below the center of the front wheel. The movable wheel engagement member may be in the form of a clamping arm having a front wheel engagement member arranged to engage a rear area of the front bicycle wheel at a location below a top of the front bicycle wheel and above the center of the front bicycle wheel. A biasing arrangement may be interconnected with the clamping arm for biasing the clamping arm toward the front bicycle wheel, with the biasing arrangement and the clamping arm being configured to be pivoted against a biasing force applied by the biasing arrangement as the front bicycle wheel is advanced on the ramp so that when the front bicycle wheel is moved past the ramp and comes into contact with the front edge of the ramp, the clamping arm biases the front bicycle wheel against the front edge of the ramp.

The bicycle parking arrangement may include a frame that supports a series of bicycle parking arrangements including one or more upper bicycle parking arrangements, each of which includes an upper tray, and one of more lower bicycle parking arrangements, each of which includes a lower tray. The stationary wheel engagement structure may be carried by an upper tray and may be configured to engage a rear area of the rear bicycle wheel, and the movable wheel engagement member may be carried by the upper tray and configured to engage a front area of the front bicycle wheel. The upper tray may be movably interconnected with the frame for movement between an upper bicycle storage position and a lowered bicycle loading position. Representatively, the upper tray may be movably engaged with a track supported by the frame, for movement between an elevated forward position and an elevated rearward position, and the upper tray may be movable to the lowered bicycle loading position from the elevated rearward position. The upper tray may be movably engaged with the track via a trolley that is movable on the track between a forward position and a rearward position, and the upper tray may be movable to the lowered bicycle loading position via a pivot connection between the trolley and a forward end defined by the upper tray. A biasing arrangement may be interposed between the trolley and the forward end of the upper tray. The biasing arrangement and the forward end of the upper tray may be configured to resist movement of the upper tray from the elevated rearward position toward the lowered loading position, and to assist in moving the upper tray to the elevated rearward position from the lowered loading position. In one form, the biasing arrangement may be in the form of a gas spring cylinder assembly interconnected between the trolley and the forward end of the tray. The movable wheel engagement member may be in the form of a wheel engagement arm pivotably mounted to the upper tray, and an actuator mechanism may be interconnected with the wheel engagement arm for selectively moving the wheel engagement arm between an engaged position, in which the wheel engagement arm is engaged with the front bicycle wheel, and a disengaged position in which the wheel engagement arm is disengaged from the front bicycle wheel. The actuator mechanism may be in the form of a ratchet arrangement carried by the upper tray and a link connected between the ratchet arrangement and the wheel engagement arm, for moving the wheel engagement arm between the engaged position and the disengaged position in response to operation of the ratchet arrangement. Representatively, the ratchet arrangement may be in the form of a ratchet handle pivotably mounted to the upper tray. Pivoting movement of the ratchet handle is operable to move the wheel engagement member between the engaged position and the disengaged position, and a ratchet mechanism is interconnected with the ratchet handle for selectively maintaining the ratchet handle in a position that maintains the wheel engagement member in the engaged position. The ratchet mechanism further includes a release actuator carried by the ratchet handle for disengaging the ratchet mechanism and enabling movement of the ratchet handle to move the wheel engagement member to the disengaged position.

According to another aspect of the invention, method of storing a bicycle when the bicycle is not in use includes placing the bicycle on a tray member, and clamping at least one wheel of the bicycle against a stationary wheel engagement structure of the tray member using a movable engagement member carried by the tray member. The act of clamping at least one wheel of the bicycle may be carried out by positioning the rear bicycle wheel against a rear wheel engagement area defined by the tray member, and moving the movable engagement member into engagement with the front bicycle wheel, with the rear wheel engagement area and the movable engagement member being configured to clamp the bicycle against the tray member. A forward area of the tray may be pivotably secured to a trolley movably mounted to an elevated track, and the tray may be moved to a lowered loading position from a raised position by lowering a rear portion of the tray via pivoting movement of the forward area of the tray relative to the trolley while maintaining the trolley in engagement with the track. The tray may be moved to a raised storage position by advancing the trolley on the track from a rearward loading position to a forward storage position.

According to another aspect of the invention, a dual level bicycle parking rack includes a series of lower bicycle parking stations and a series of upper bicycle parking stations. Each lower bicycle parking station may include a lower tray configured to underlie the front wheel of a first bicycle; a stationary wheel engagement structure associated with the lower tray that is arranged to engage the front bicycle wheel on a first side of the center of the front bicycle wheel; and a first movable wheel engagement member arranged to engage the front bicycle wheel on a second side of the center of the front bicycle wheel. Engagement of the first movable wheel engagement member with the second side of the front bicycle wheel and engagement of the stationary wheel engagement structure with the first side of the front bicycle wheel functions to apply a clamping force on the front bicycle wheel therebetween to maintain the front bicycle wheel, and therefore the first bicycle, in an upright position. Each upper bicycle parking station may include an upper tray configured to underlie both the front and rear wheels of a second bicycle; a stationary rear wheel engagement structure that is arranged to engage the rear bicycle wheel on a rear side of the center of the rear bicycle wheel; and a second movable front wheel engagement member arranged to engage the front bicycle wheel on a front side of the center of the front bicycle wheel. Engagement of the second movable wheel engagement member with the front side of the front bicycle wheel and engagement of the stationary wheel engagement structure with the rear side of the rear bicycle wheel functions to apply a clamping force on the front and rear bicycle wheels therebetween to maintain the front and rear bicycle wheels, and therefore the second bicycle, in an upright position. The upper tray defines a forward end that is movably engaged with a trolley that is movable on a track between a forward position and a rearward position, and the upper tray may be movable between a lowered loading position by downward movement of a rear area of the upper tray relative to the trolley when the trolley is in the rearward position, and a raised position by upward movement of the rear area of the upper tray relative to the trolley when the trolley is in the rearward position. Movement of the trolley to the forward position on the track while the upper tray is in the raised position places the upper tray and trolley in an elevated storage position in which the first bicycle is positioned below the second bicycle. The second movable wheel engagement member may be pivotably mounted to the upper tray and movable between an engaged position and a disengaged position via a movable actuator arrangement carried by the upper tray and operable to move the second movable wheel engagement member between the engaged position and the disengaged position.

Other aspects, features and advantages of the invention will become apparent to those skilled in the art from the following detailed description and accompanying drawings. It should be understood, however, that the detailed description and specific examples, while indicating certain embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention will become more readily apparent by referring to the exemplary, and therefore non-limiting, embodiments illustrated in the drawings accompanying and forming a part of this specification, wherein like reference numerals designate the same elements in the several views.

In the drawings:

FIGS. 24 and 25 are views similar to FIGS. 22 and 23, respectively, showing the ratchet handle mechanism in an engaged position;

FIG. 34 is a section view taken along line 34-34 of FIG. 30.

Figure 1:
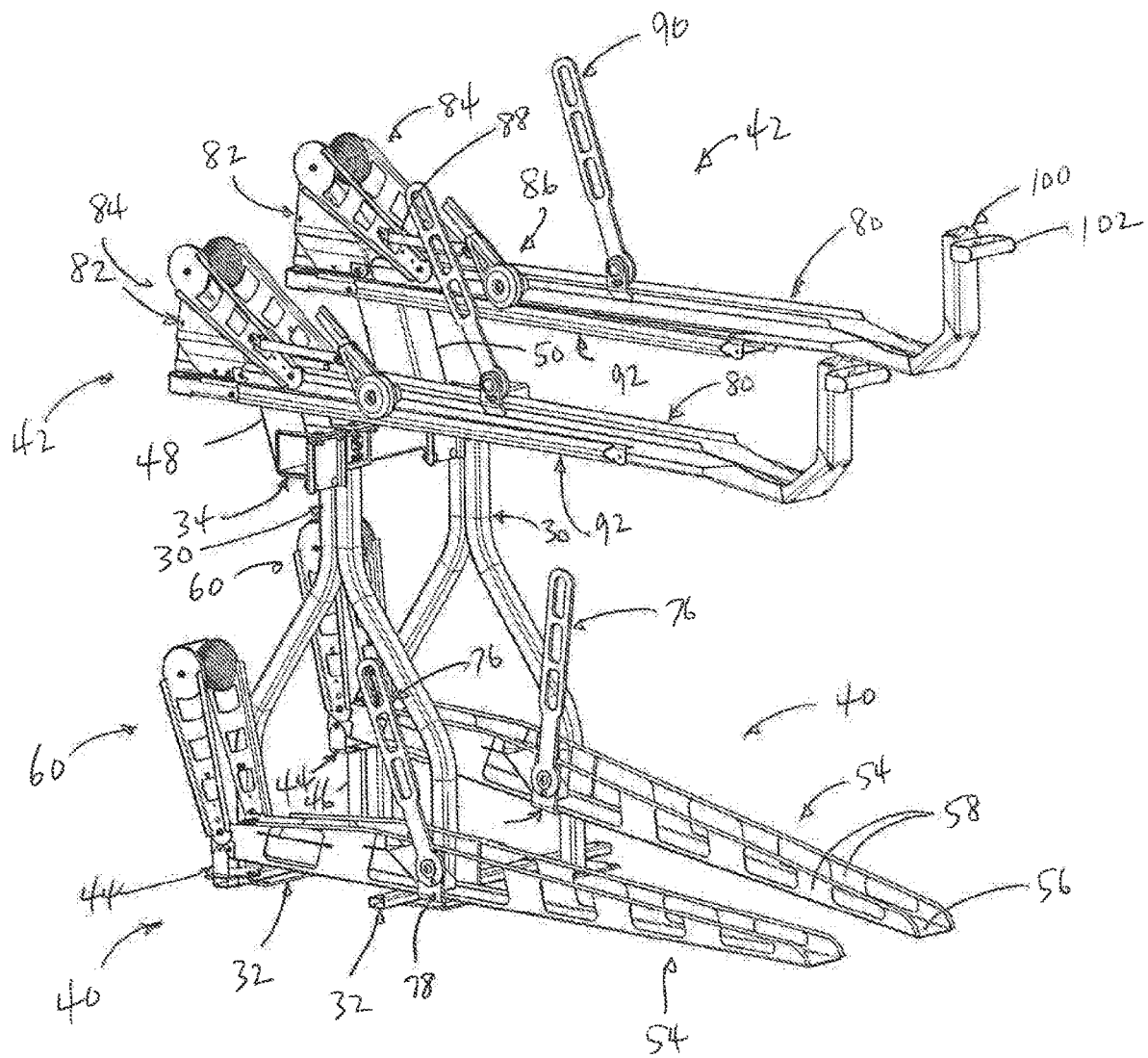
FIG. 1 is an isometric view of a section of a representative embodiment of a dual level bicycle parking or storage rack in accordance with the present invention.
Figure 2:
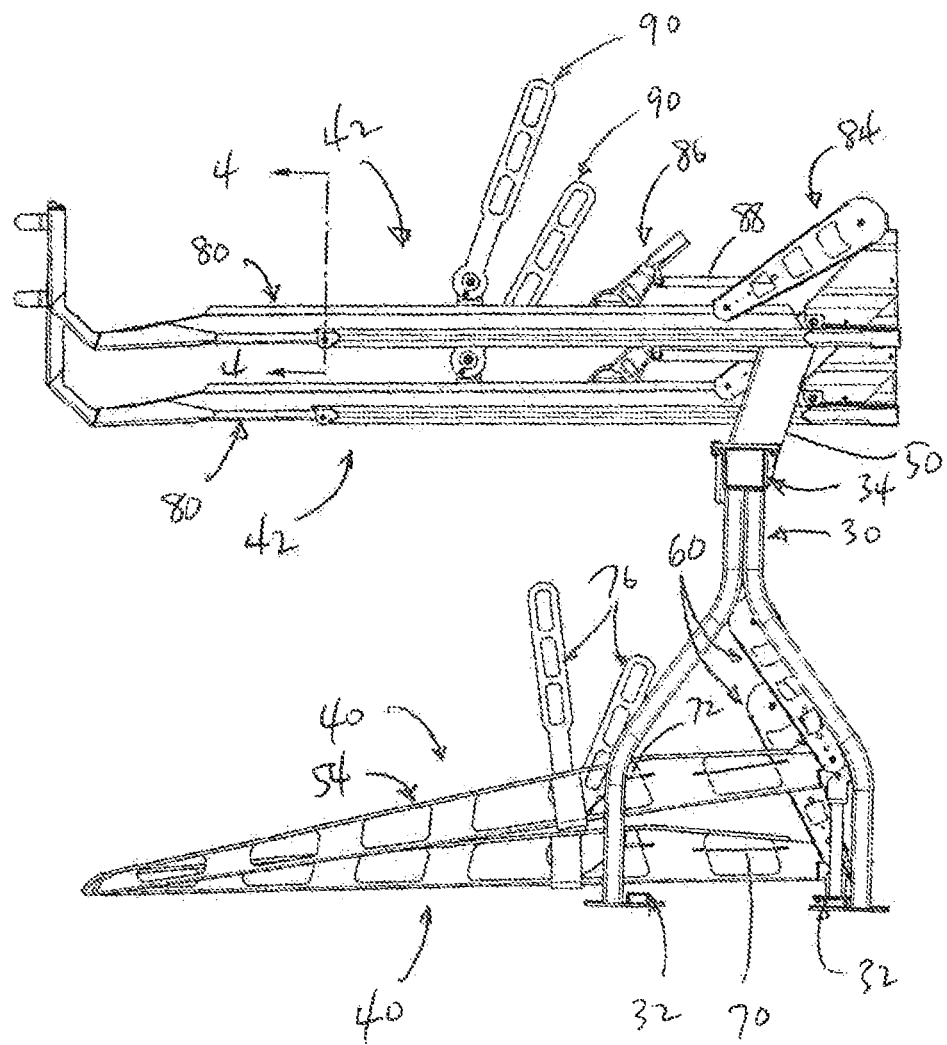
FIG. 2 is a side elevation view of the dual level bicycle parking or storage rack section of FIG. 1.

In describing the embodiments of the invention which are illustrated in the drawings, specific terminology will be resorted to for the sake of clarity. However, it is not intended that the invention be limited to be specific terms so selected and it is to be understood that each specific term includes all technical equivalents which operate in a similar manner to accomplish a similar purpose. For example, the words "connected," "attached," or terms similar thereto are often used. They are not limited to direct connection or attachment, but include connection or attachment to other elements where such connection or attachment is recognized as being equivalent by those skilled in the art

DETAILED DESCRIPTION OF THE INVENTION

The various features and advantageous details of the subject matter disclosed herein are explained more fully with reference to the non-limiting embodiments described in detail in the following description.

Referring to the following description in which like reference numerals represent like parts throughout the disclosure, FIG. 1 illustrates a pair of adjacent sections of a dual level bicycle parking or storage rack in accordance with the present invention. The rack may include a frame having a series of spaced apart upright frame members 30, which extend upwardly from and are supported by a pair of parallel, longitudinally extending lower frame members 32. At their upper ends, the upright frame members 30 support a longitudinally extending upper frame member 34. FIG. 1 illustrates the upright frame members 30, lower frame members 32 and upper frame member 34 as supporting a pair of the lower bicycle support assemblies 40 that form a pair of lower elevation bicycle parking stations, and a pair of upper bicycle support assemblies 42 that form a pair of upper level bicycle parking stations. In the illustrated embodiment, the adjacent lower bicycle support assemblies 40 and upper bicycle support assemblies 42 are vertically offset from each other in order to prevent interference between components, such as handlebars, of adjacent bicycles supported by the lower bicycle support assemblies 40 and upper bicycle support assemblies 42. This is accomplished, for example, by engaging a lower front mounting bracket such as 44 at different elevations. In the illustrated embodiment, the lower front mounting bracket 44 of one of the lower bicycle support assemblies 40 is mounted directly on one of lower frame members 32, and the lower front mounting bracket 44 of the adjacent lower bicycle support assembly 40 is elevated via a riser 46 positioned between the lower front mounting bracket 44 and the lower frame member 32. With respect to upper bicycle mounting assemblies 42, adjacent ones can be mounted to support struts 48, 50 that have different lengths so that the upper bicycle support assembly 42 supported by strut 50 is located above the upper bicycle support assembly 42 supported by strut 48.

As can be appreciated, a dual level bicycle parking or storage rack having any desired length and any desired capacity may be constructed using the components set forth above and described in detail below. That is, a frame may be constructed using any desired number of upright frame members 30 connected along any desired length of lower frame members 32 and supporting any desired length of upper frame member 34, with any desired number of lower bicycle support assemblies 40 and upper bicycle support assemblies 42 mounted along the length of the frame so constructed.

Each lower bicycle support assembly 40 includes an axially extending lower tray 54, each of which includes a bottom wall 56 and a pair of side walls 58 extending upwardly therefrom. Tray 54 has a length selected to underlie the front and rear wheels of bicycles having a wide range of overall lengths. At its rear end, each tray 54 is adapted to rest on the ground or other supporting surface.

Figure 3:
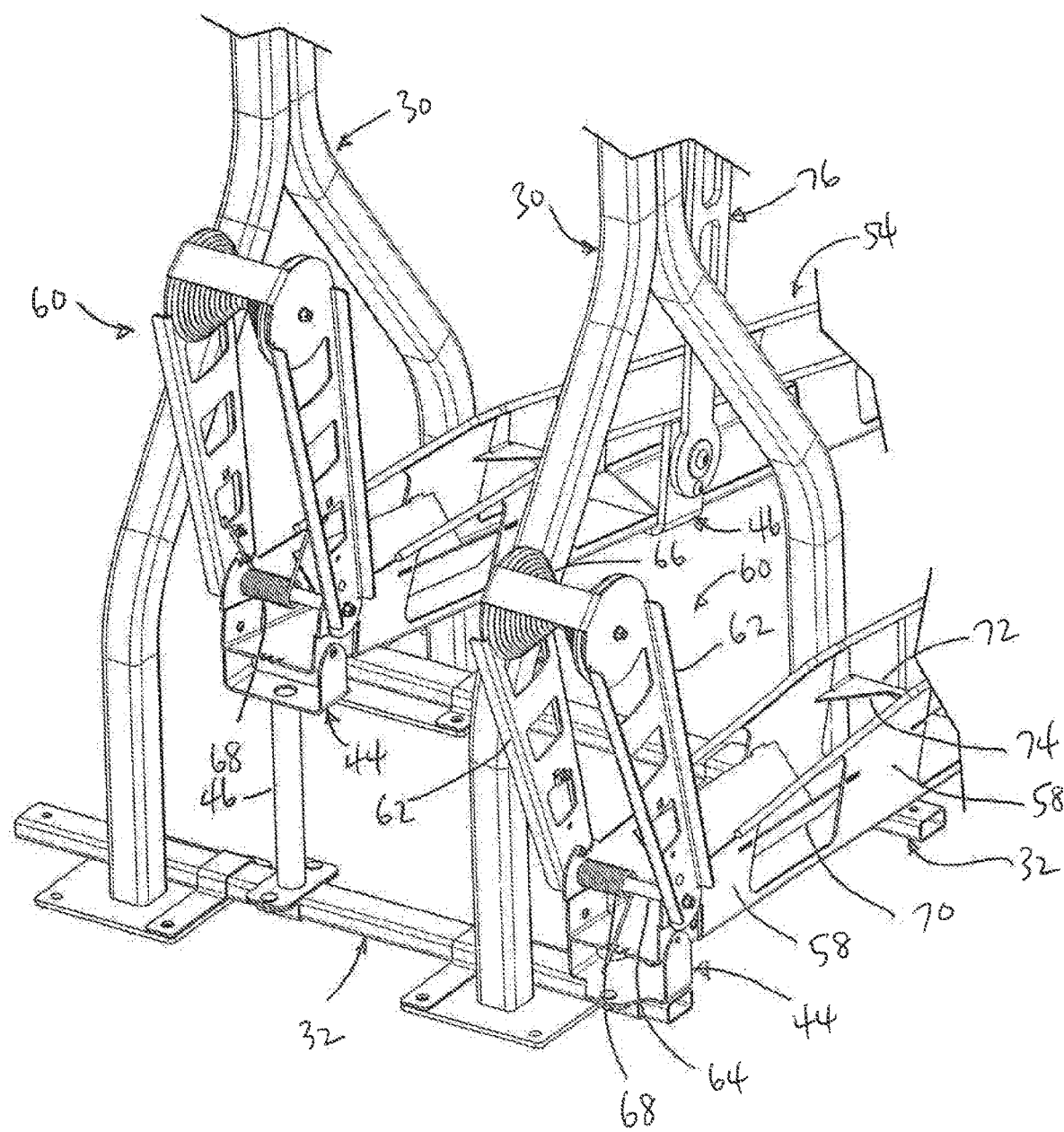
FIG. 3 is a partial isometric view illustrating front end components associated with lower level bicycle parking areas forming a part of the dual level bicycle parking or storage rack section of FIG. 1.

Referring to FIG. 3, a front wheel engagement arm 60 is pivotably mounted at the front end of each tray 54. Each engagement arm 60 includes a pair of spaced apart arm sections 62, which are pivotably mounted to tray 54 via a mounting shaft 64 extending between sidewalls 58 at the front of tray 54. A generally hourglass-shaped engagement member 66 is mounted between the outer ends of arm sections 62. The engagement member 66 is formed with stepped surface, which allows it to receive and engage bicycle tires ranging from very narrow to very wide. As shown in FIG. 3 (ASM note: change the order of the figures) a torsion spring 68 is positioned about each mounting shaft 64. The torsion spring 68 is engaged with the tray 54 and the arm sections 62 so as to rotationally bias the front wheel engagement arm 60 in a rearward direction.

A V-shaped front wheel pan 70 is mounted between sidewalls 58 rearwardly of each mounting shaft 64, and is configured to support the bottom of the front wheel of a bicycle. Rearwardly of front wheel pan 70, a ramp 72 extends forwardly and upwardly from bottom wall 56, and includes an upper end defining a notch 74.

In use, a user can park a bicycle at a one of the lower bicycle parking stations by advancing the bicycle wheels along bottom wall 56 of tray 54 and moving the front bicycle wheel forwardly and upwardly on ramp 72 until the bicycle wheel clears ramp 72 and comes into contact with front wheel pan 70, which supports the front bicycle wheel from below. The front wheel is thus also in contact with notch 74 in the upper end of ramp 72. As the front bicycle wheel is advanced in this manner, its front area comes into contact with engagement member 66, and advancement of the front bicycle wheel causes front wheel engagement arm 62 to pivot forwardly against the force of torsion spring 68 as the front bicycle wheel is moved over front wheel support tray 70 and into engagement with notch 74 in the upper end of ramp 72. Torsion spring 68 thus functions to clamp the bicycle front wheel between engagement member 66 and ramp 72 in an upright, vertical position so as to maintain the bicycle upright. The dual-conical configuration of engagement member 66 and the generally V-shaped configuration of notch 74 functions to center the bicycle wheel in the tray 54. The bicycle can be removed by pushing it forwardly to further pivot front wheel engagement arm 60 forwardly, lifting the front of the bicycle sufficiently to clear the upper end of ramp 72, and then moving it rearwardly along tray 54.

A locking arm 76 having a series of openings along its length is pivotably mounted to a lower mounting bracket 78 secured to tray 54. The locking arm 76 can be pivoted to varying angular positions relative to tray 54, and its openings can be employed to receive a locking hasp, cable or chain in order to secure the bicycle supported on tray 54.

As shown in FIG. 1, each upper bicycle support assembly 42 generally includes an upper tray 80 pivotably connected at a front end to a trolley 82, a front wheel engagement arm 84, a ratchet assembly 86 mounted to the upper tray 80, and a link 88 connected between ratchet assembly 86 and front wheel engagement arm 84. As described above with respect to each lower tray 54, each upper tray 80 also carries a locking arm 90 having a series of openings along its length. In addition, each upper bicycle support assembly 42 further includes a track 92 that underlies each tray 80, and along which each trolley 82 is movable, in a manner to be explained.

Figure 4:
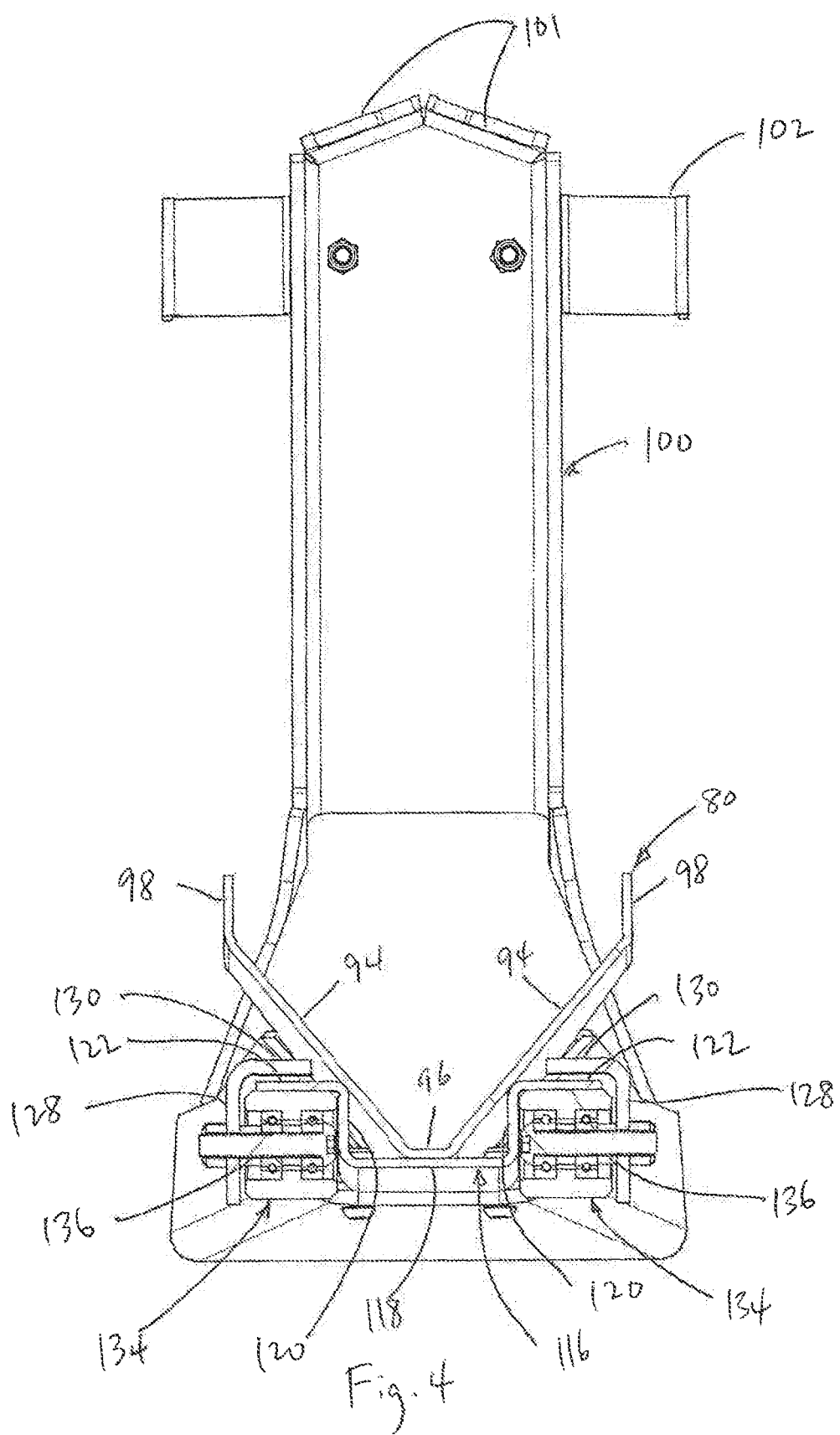
FIG. 4 is a section view taken along line 4-4 of FIG. 2.
Figure 5:
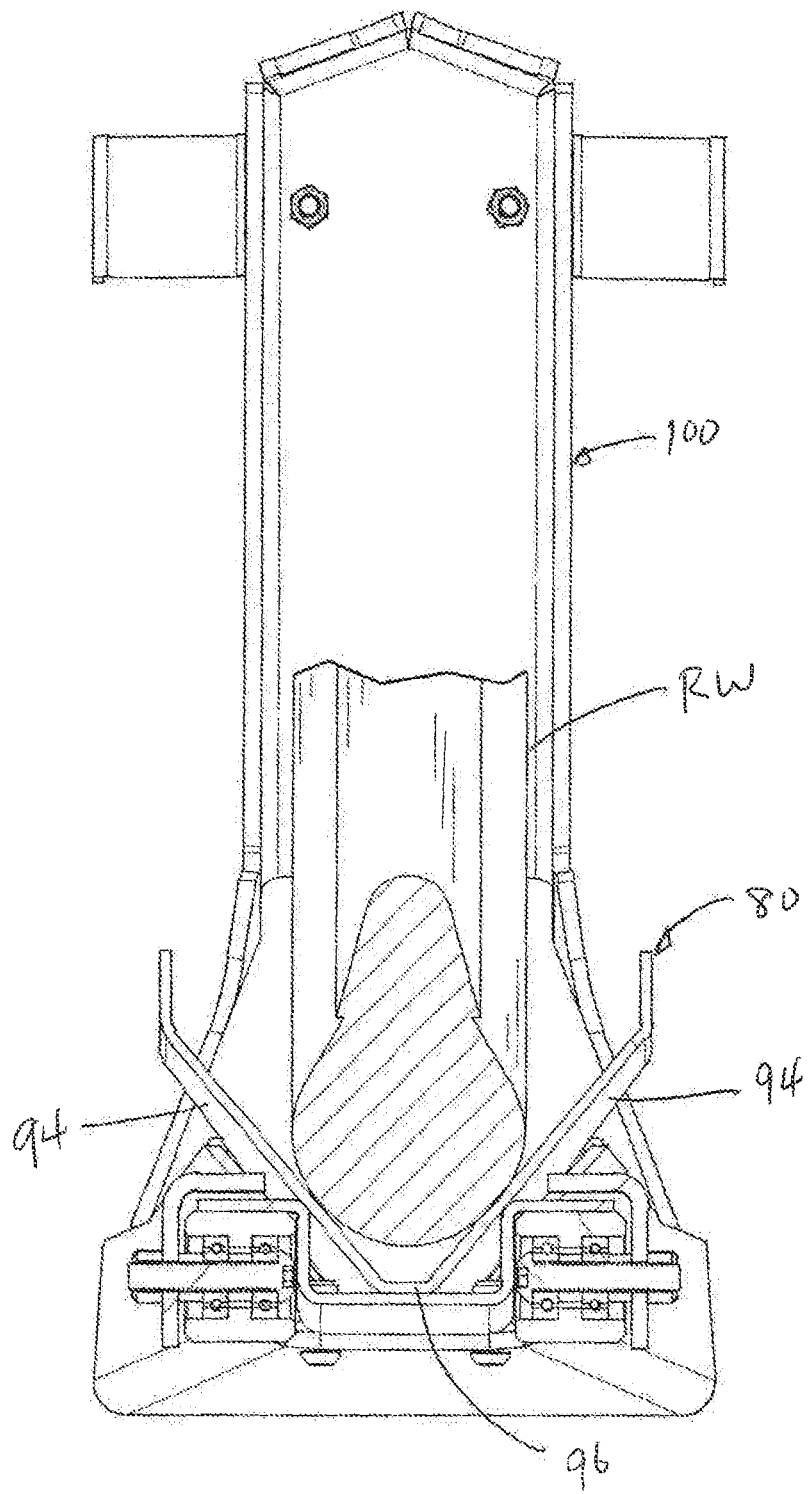
FIG. 5 and FIG. 6 are section views similar to FIG. 4 illustrating different tire and wheel configurations.
Figure 6:
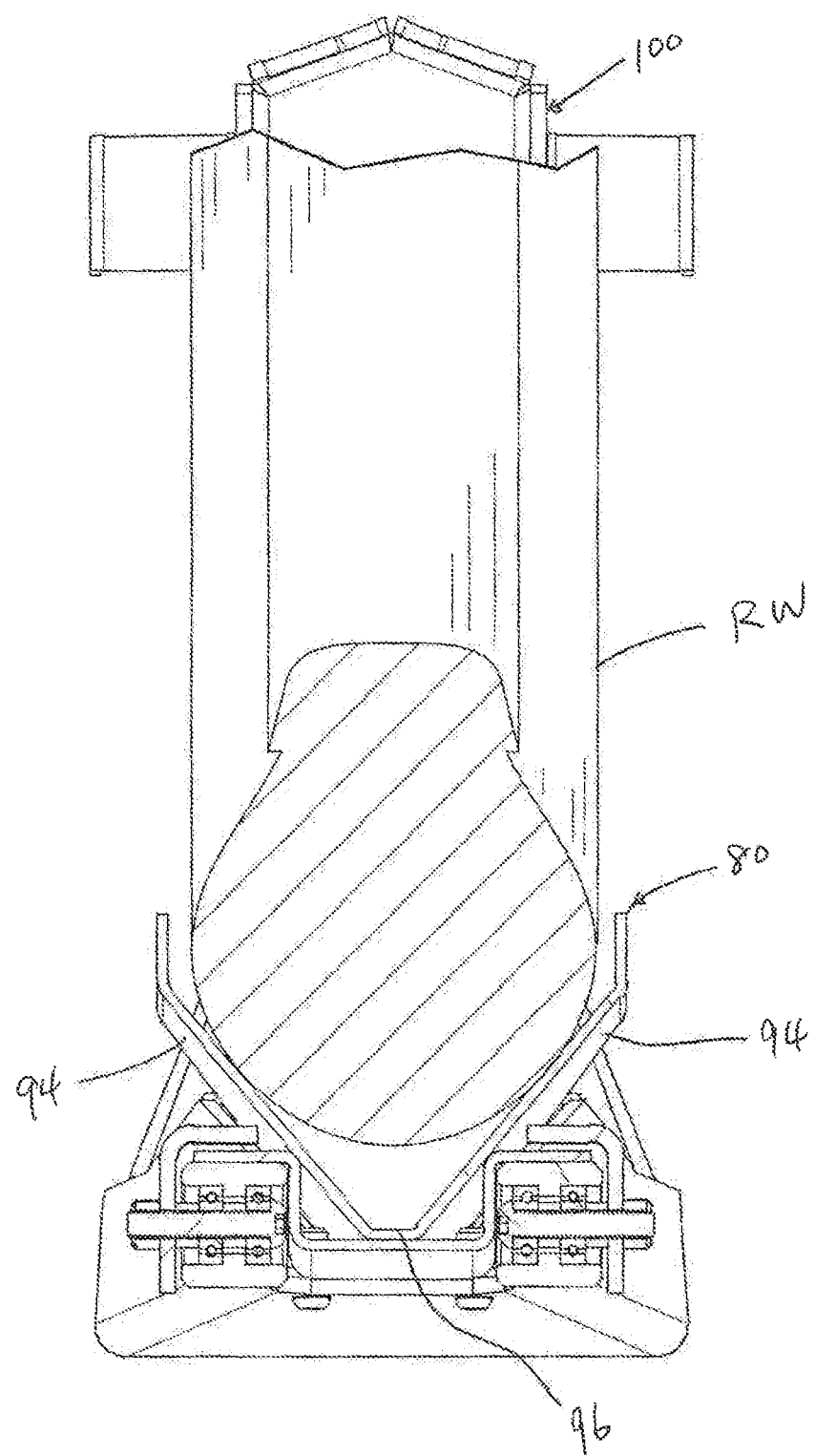
Figure 7:
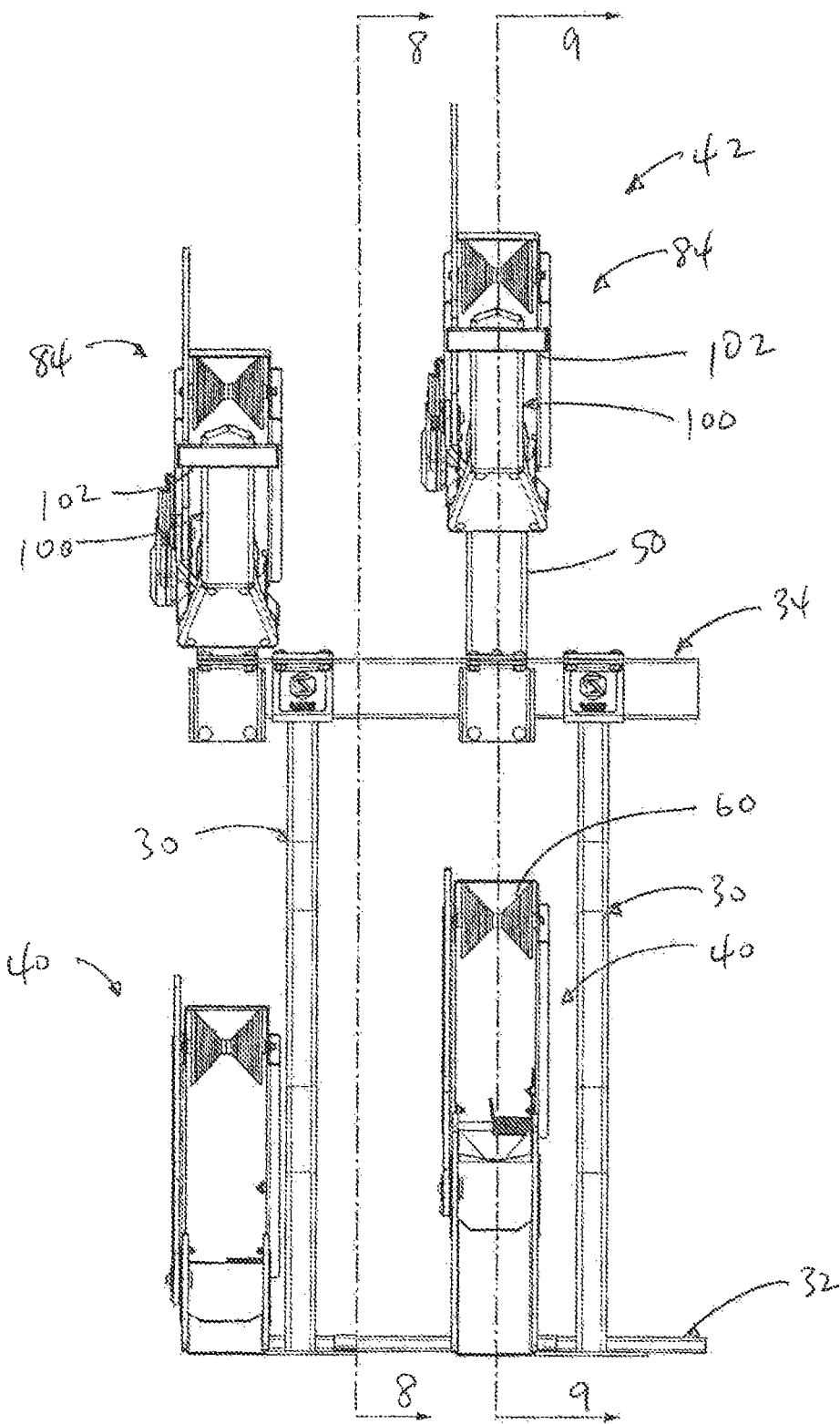
FIG. 7 is an end elevation view of the dual level bicycle parking or storage rack section of FIG. 1.

As shown in FIG. 4, each tray 80 has a cross-section that is generally V-shaped, having a pair of side walls 94 that extend upwardly from a bottom wall 96 and diverge from each other. Sidewalls 94 terminate in spaced apart upper ends 98. The sidewalls 94 and upper ends 98 are configured so as to receive the widest available bicycle tire. Conversely, the width of bottom wall 96 is narrower than the narrowest bicycle tire, such that the sides of the narrowest bicycle tire can nestle against the sidewalls 94 when supported from below by bottom wall 96. FIGS. 5 and 6 illustrate differently configured bicycle wheels in engagement with and supported by upper tray 80.

At its rear end, upper tray 80 is provided with an upwardly extending rear wheel engagement portion 100. In the illustrated embodiment, the rear wheel engagement portion 100 extends generally perpendicularly relative to the majority of the length of upper tray 80 located forwardly of it. Rear wheel engagement portion 100 and the adjacent rearward portion of upper tray 80 is configured to receive and nestle against the lower and rear areas of a rear wheel of a bicycle to be supported their above, in a manner to be explained. A handle 102 is secured to the upper end of rear wheel engagement portion 100.

Referring to FIGS. 9-18, at its forward end upper tray 80 includes a forward extension arm 104. The forward end of upper tray 80 is pivotably secured to trolley 82 via a pivot shaft 106 that is fixed within the interior of trolley 82 and pivotably engaged with forward extension arm 104. A gas spring cylinder assembly 108 has a piston rod 110 that is pivotably engaged with the forward end of upper tray extension arm 104 and a cylinder 112 that is pivotably secured to a mounting bracket 114 located within the interior of trolley 82. Gas spring cylinder assembly 108 functions to bias extension arm in a downward or counterclockwise direction (with reference to FIGS. 10 and 11) about pivot shaft 104, which functions to bias upper tray 80 toward its raised position.

Referring to FIG. 4, a longitudinally extending carrier member 116 underlies upper tray 80. The carrier member 116 includes a generally horizontal lower wall 118 to which bottom wall 96 of upper tray 80 is secured, in combination with a pair of upstanding sidewalls 120 and a pair of generally horizontal side flanges 122.

As shown in FIGS. 4 and 14-18, the track 92 extends longitudinally and includes a pair of sidewalls 128, a pair of top walls 130 that extend inwardly toward each other from the upper ends of sidewalls 128, and a bottom wall 132 that extends between and interconnects the bottom ends of sidewalls 128. With this configuration, track 92 functions to define a pair of spaced apart facing channels. Track 92 is configured such that, at its rearward end, the bottom wall 132 of track 92 is removed and a pair of rotatable rollers 134 are secured to track 92 via a pair of roller-mounting axles or shafts 136 secured to track sidewalls 128. The rollers 134 are located below the track top walls 130, and each side flange 122 of carrier member 116 is supported on one of the rollers 134 between the top of the roller 134 and the underside of the facing track top wall 130.

Each trolley 82 includes an upper housing portion 138 within which the gas spring cylinder assembly 106 is contained, in combination with a lower truck portion 140. The lower truck portion 140 supports front and rear sets of rotatable rollers 142, which are longitudinally movable within the channels defined by track sidewalls 128, top walls 130 and bottom wall 132.

The front wheel engagement arm 84 of each upper bicycle support assembly 40 has generally the same construction as front wheel engagement arms 60 of each lower bicycle support assembly 40 as described above. However, in each upper bicycle support assembly 40, the front wheel engagement arm 84 is moved between an engaged position and a release position by operation of ratchet assembly 86 and link 88 rather than via a torsion spring.

The front end of each link 88 is pivotably secured to one of the arm sections of front wheel engagement arm 84. At its rearward end, each link 88 is pivotably secured to a pivot mount 144 of ratchet assembly 86.

Referring to FIGS. 19-26, each ratchet assembly 86 includes a handle portion 146 that is pivotably secured to a mounting block 148, which in turn is fixed to upper tray 80, such as by mounting to an upper end 98 of one of the tray sidewalls 94. Mounting block 148 includes an arcuate set of stationary gear teeth 150, and ratchet handle portion 146 includes a handle mounting portion 152 that is pivotably mounted to mounting block 148 adjacent gear teeth 150.

Ratchet handle assembly 86 further includes a ratchet member 154 that is pivotably mounted to a mounting bracket 156 secured to ratchet handle portion 146. Ratchet member 154 includes a set of gear teeth 158 that face the arcuate set of stationary gear teeth 150, and a release lever 160 that extends from the opposite side of mounting bracket 156 from gear teeth 158. A ratchet release actuator 162 is pivotably mounted to ratchet handle portion 146 via a pivot mounting member 164, and includes an outer actuating portion 166 and an inner actuating arm 168 that is located adjacent release lever 160 of ratchet member 154. A spring 170 is engaged between mounting bracket 156 and ratchet member 154 and is configured to bias teeth 158 of ratchet member 154 toward and into engagement with stationary gear teeth 150. A spring 172 is engaged between ratchet handle portion 146 and actuating arm 168 of release actuator 162, and is configured to bias actuating arm 168 away from release lever 160 of ratchet member 154.

Figures 22, 23:
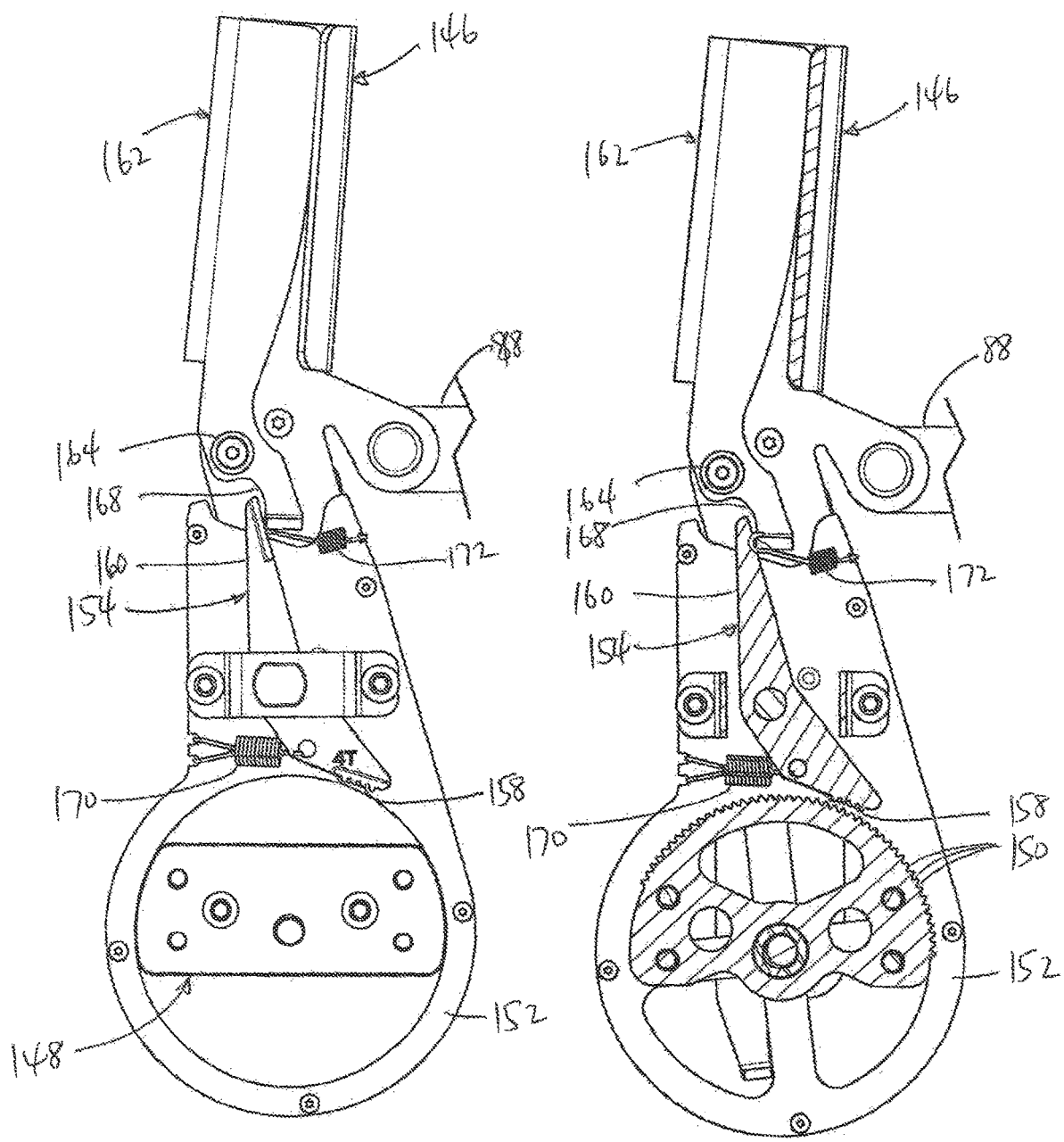
FIG. 22 is an elevation view of the ratchet handle mechanism of FIG. 21 in a disengaged position
FIG. 23 is a section view of the ratchet handle mechanism of FIG. 22.
Figure 26:
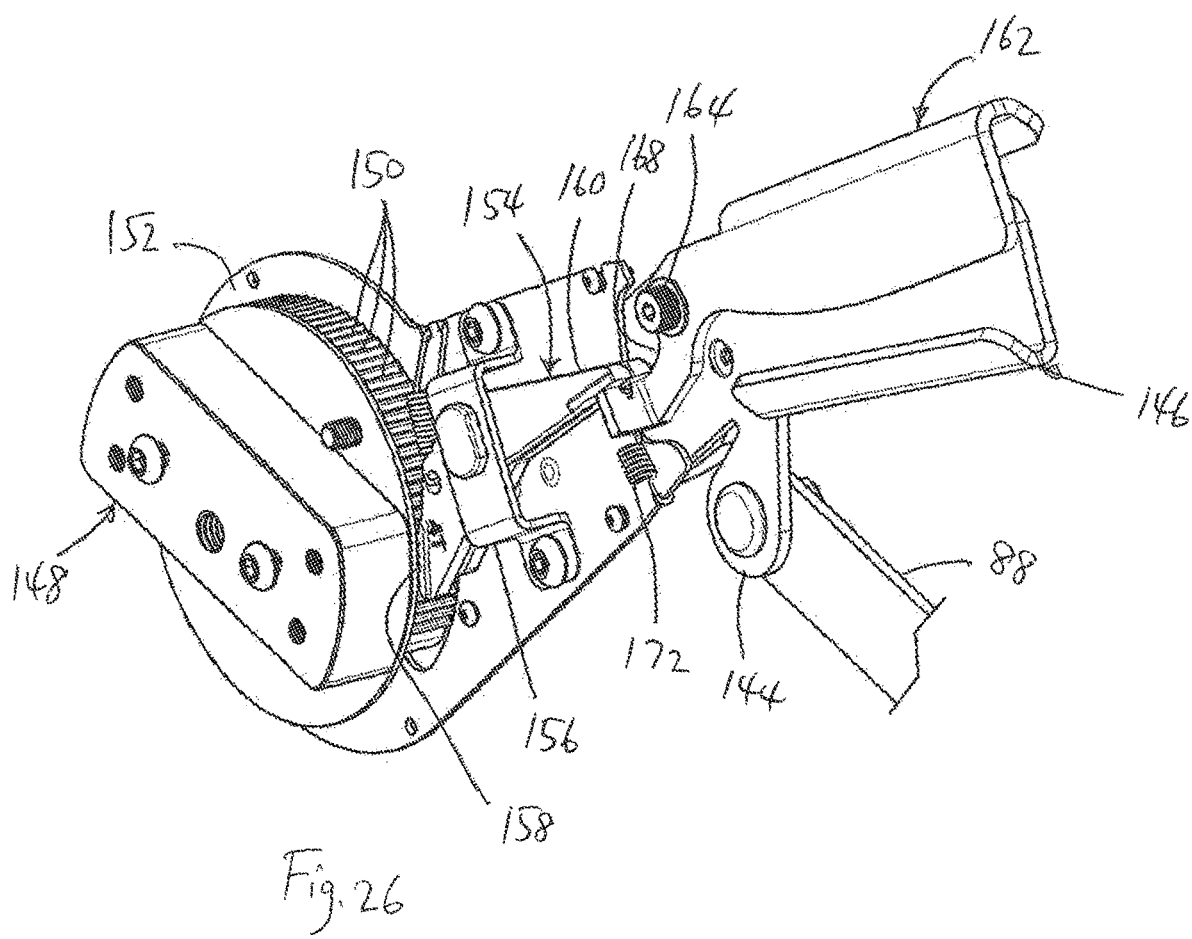
FIG. 26 is an isolated isometric view similar to FIG. 20, showing the ratchet handle mechanism in an operative or engaged position.

In operation, ratchet assembly 86 may be employed to move front wheel engagement arm 84 from a forward position toward a rearward position via rearward pivoting movement of ratchet handle portion 146 in a rearward direction, which movement causes rearward pivoting movement of front wheel engagement arm 84 via link 88. Ratchet member gear teeth 158 and the stationary gear teeth 150 are configured such that, as ratchet handle portion 146 is pivoted rearwardly, as shown in FIGS. 24 and 25, ratchet member teeth 158 are able to move over stationary gear teeth 150. When pivoting movement of ratchet handle portion 146 is discontinued, ratchet member gear teeth 158 are moved into engagement with the underlying stationary gear teeth 150 under the influence of spring 172, to maintain the rotational position of ratchet handle portion 146 and thereby front wheel engagement arm 84. In order to move ratchet handle portion and front wheel engagement arm 84 in the opposite, forward direction, release actuator 162 is pivoted on pivot mounting member 184 so as to move actuating arm 168 of release actuator 162 into engagement with release lever 160 of ratchet member 154, against the influence of spring 172. This functions to pivot ratchet member 154 relative to mounting bracket 156, against the influence of spring 170, to move ratchet member gear teeth 158 out of engagement with stationary gear teeth 150 as shown in FIGS. 22 and 23. While release actuator 162 remains pivoted in this manner, ratchet handle portion 146 can be pivoted forwardly, causing forward pivoting movement of front wheel engagement arm 84. When release actuator 162 returns to its rest position under the influence of spring 172, release lever 160 of ratchet member 154 is allowed to return to its rest position under the influence of spring 170, which again moves ratchet member gear teeth 158 into engagement with stationary gear teeth 150 under the influence of spring 170.

Figure 19:
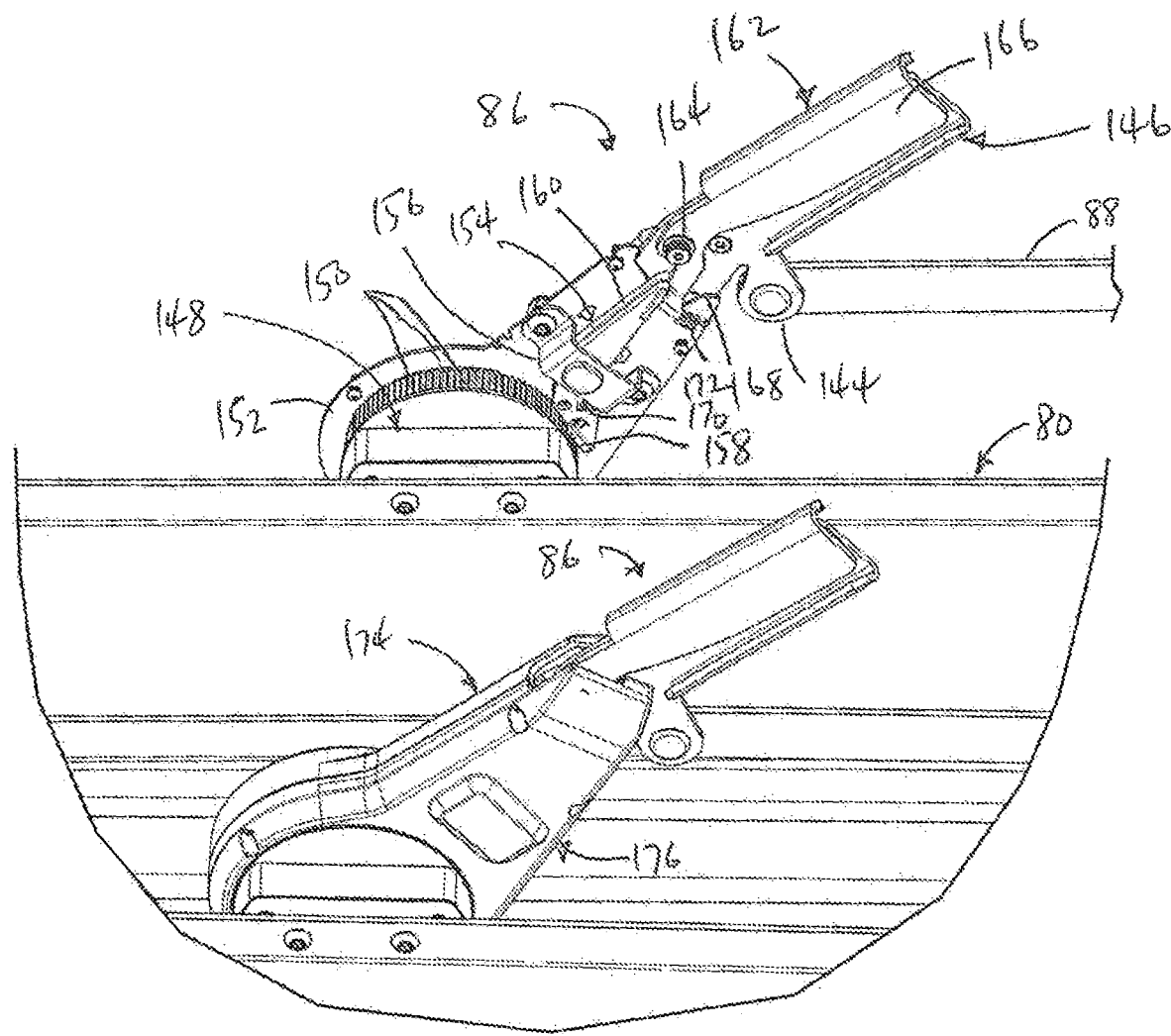
FIG. 19 is a partial isometric view illustrating ratchet handle mechanisms forming a part of the upper level components of the first and second upper level parking stations in the dual level bicycle parking or storage rack section of FIG. 1.
Figure 20:
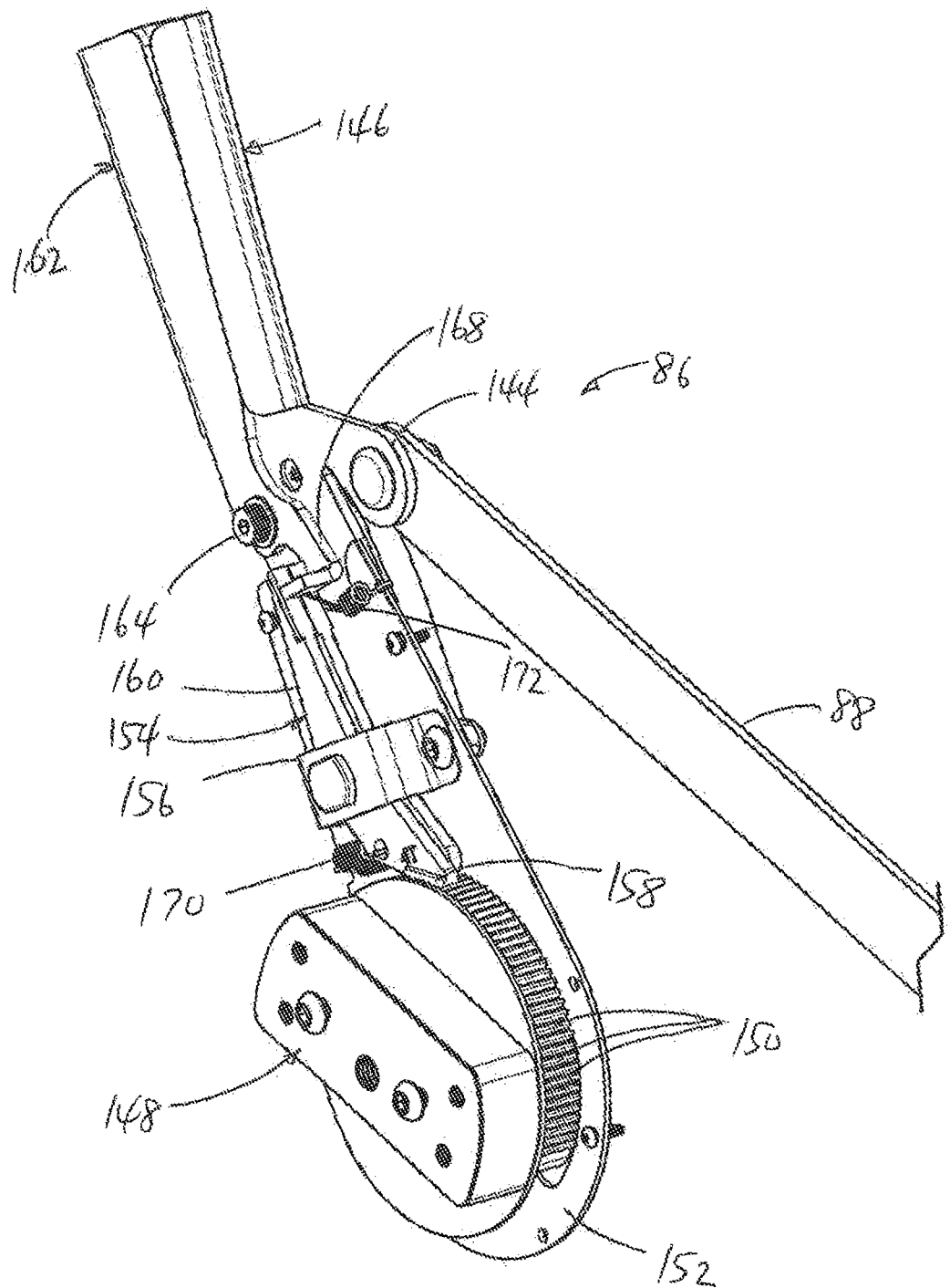
FIG. 20 is an isolated isometric view of one of the ratchet handle mechanisms as in FIG. 19, showing the ratchet handle mechanism in a retracted or disengaged position.
Figure 21:
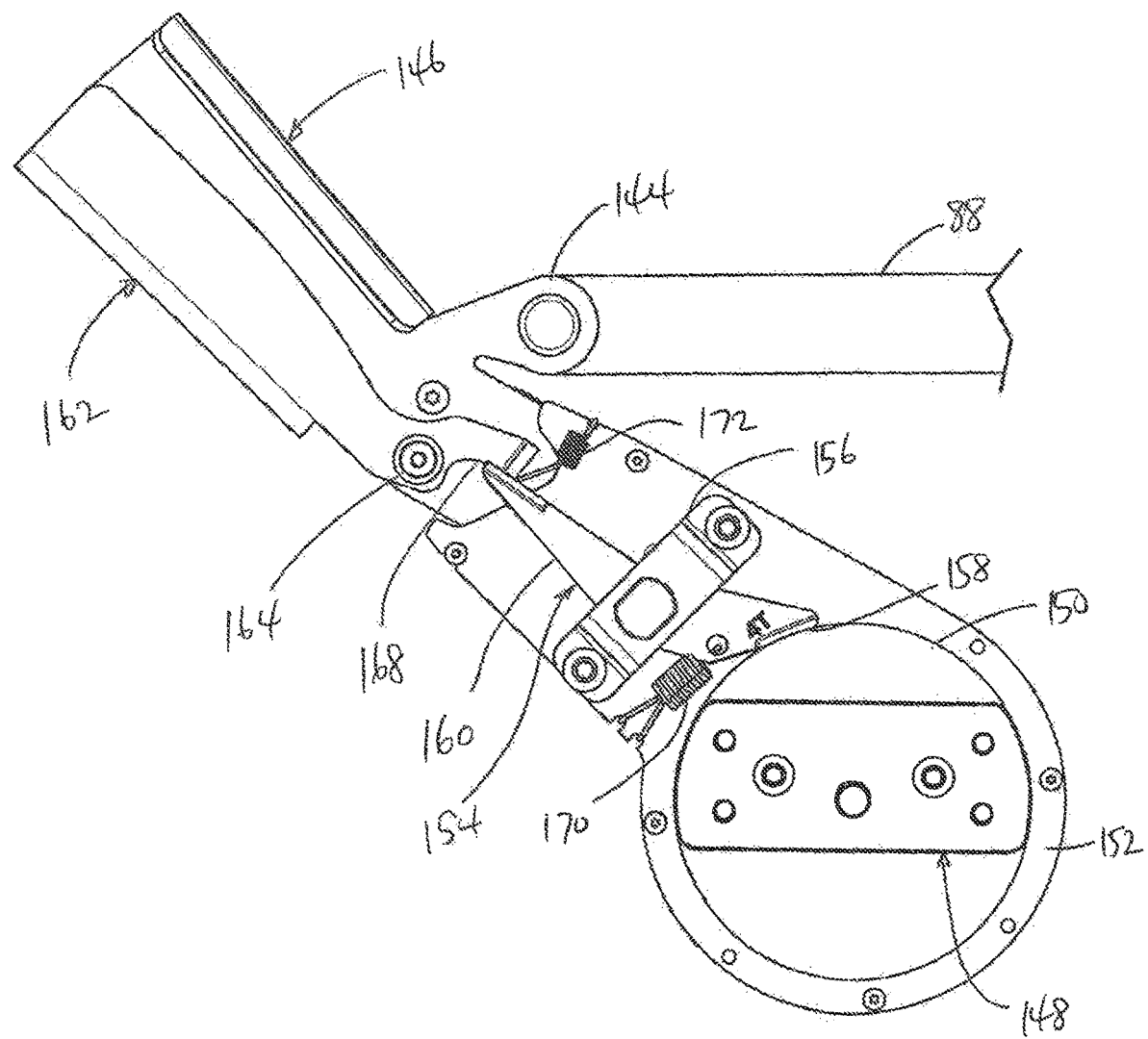
FIG. 21 is an elevation view of the ratchet handle mechanism of FIG. 20, showing the ratchet handle mechanism in an engaged position.

In FIG. 19, the upper illustrated ratchet assembly 86 is shown with the ratchet mechanism components exposed, as is also the case with FIGS. 20-26. The lower illustrated ratchet assembly 86 in FIG. 19 is shown with a pair of cover members 174, 176, which may be secured together about the ratchet assembly components located inwardly of release actuator 162 and pivot mount 144.

Figure 8:
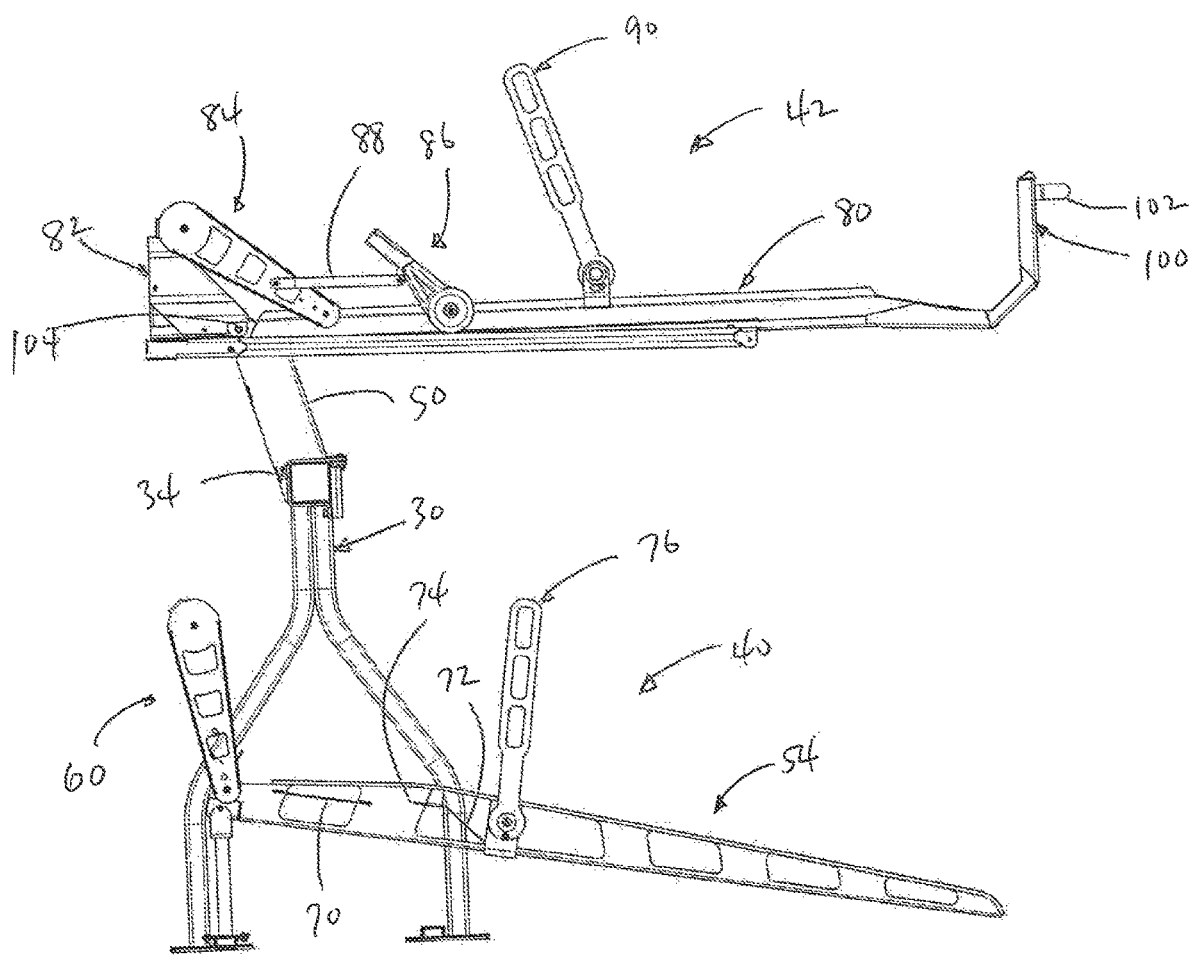
FIG. 8 is a section view taken along line 8-8 of FIG. 7.
Figure 9:
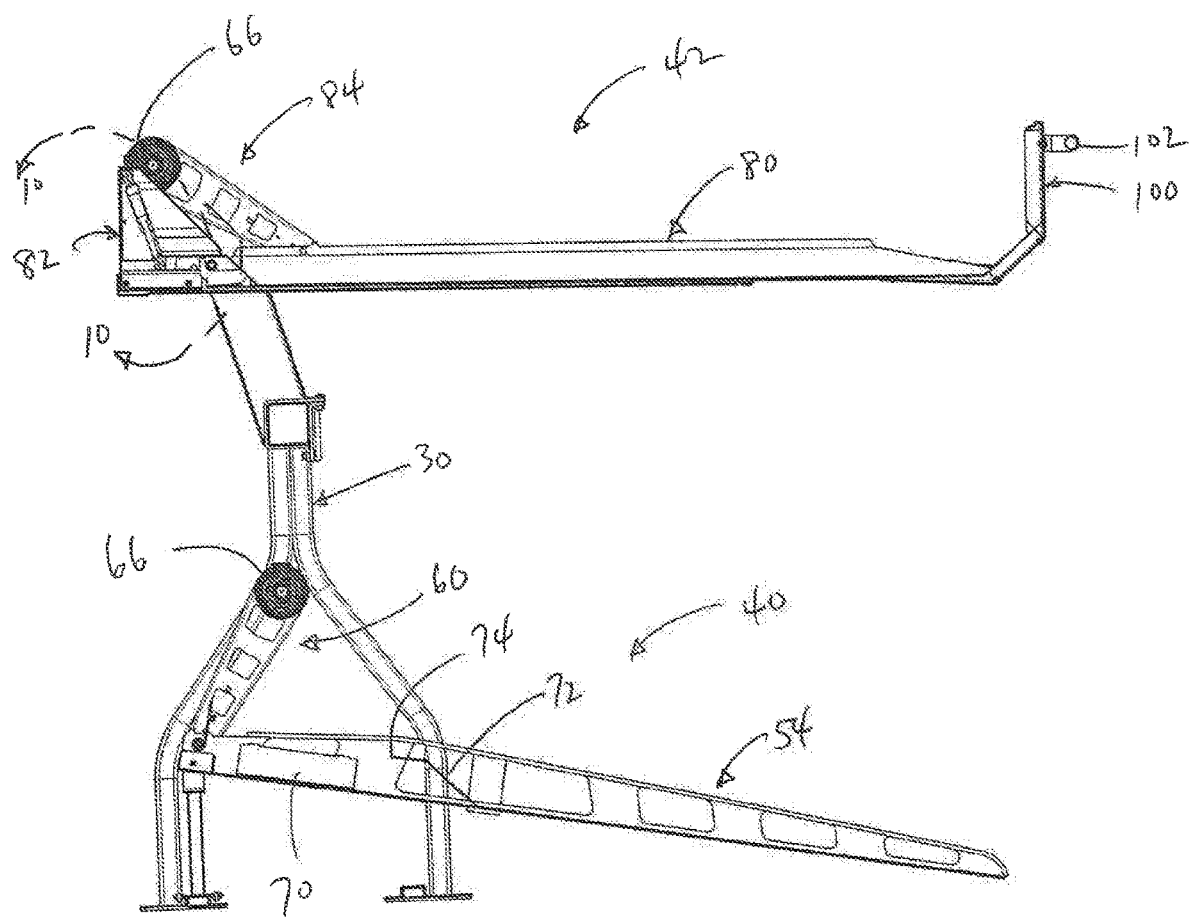
FIG. 9 is a section view taken along line 9-9 of FIG. 7.
Figure 10:
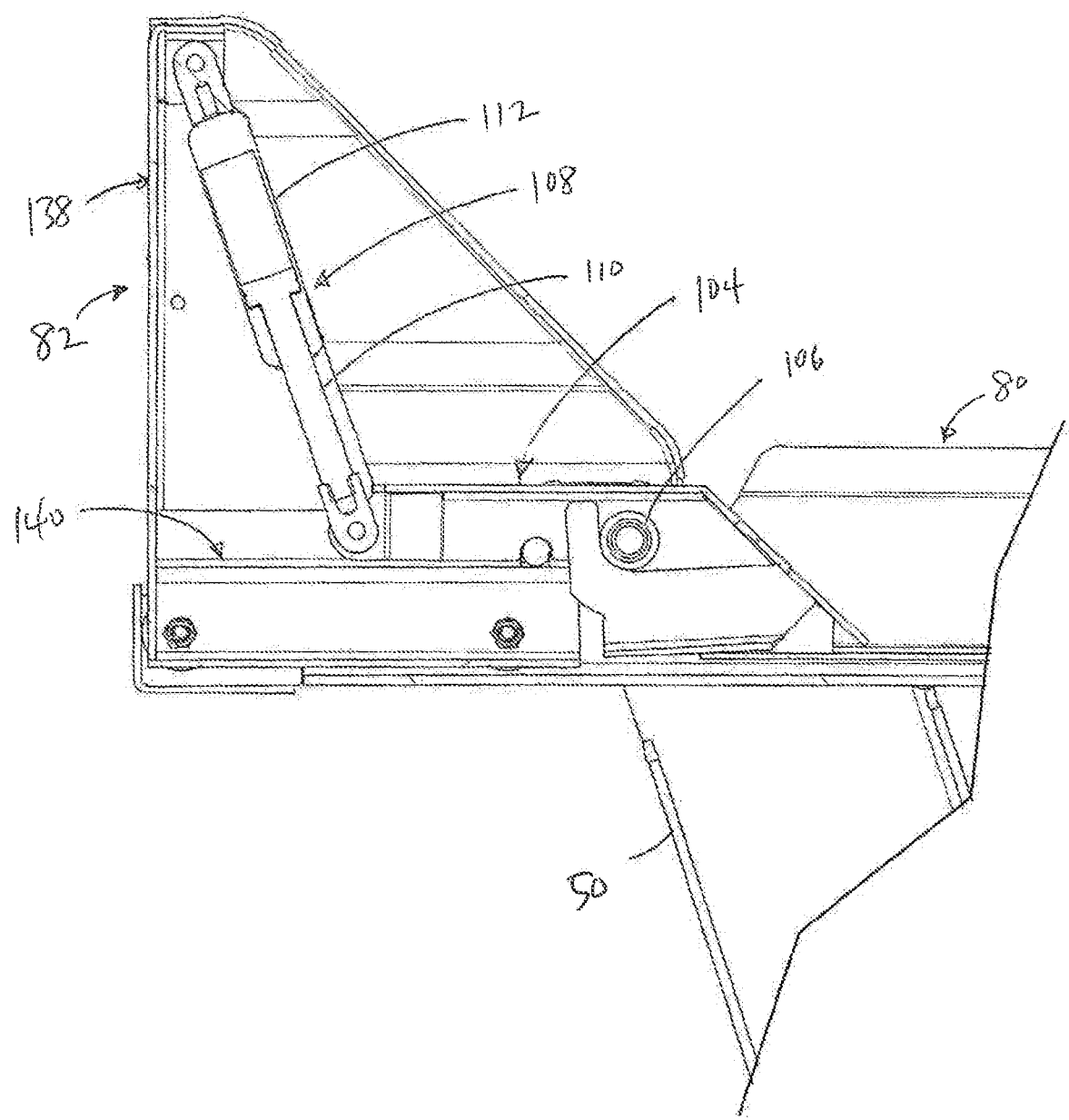
FIG. 10 is an enlarged partial section view, with reference to line 10-10 of FIG. 9, illustrating a trolley assembly incorporating a gas spring assist cylinder and showing the gas spring assist cylinder in an extended position when the upper level parking station components are in a raised position.
Figure 11:
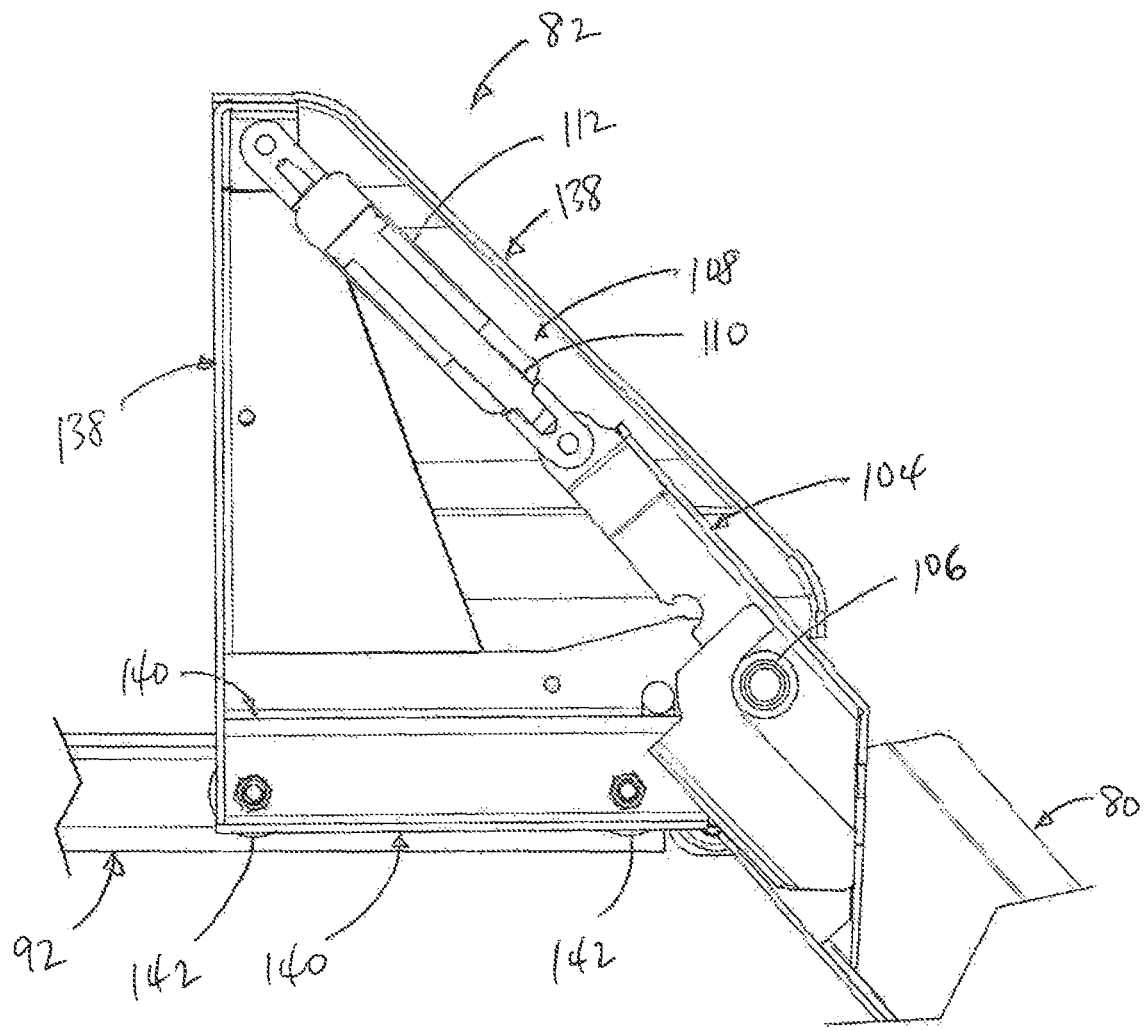
FIG. 11 is an enlarged partial section view similar to FIG. 10, showing the gas spring assist cylinder in a retracted position when the upper level parking station components are in a bicycle loading or engaging position.
Figure 12:
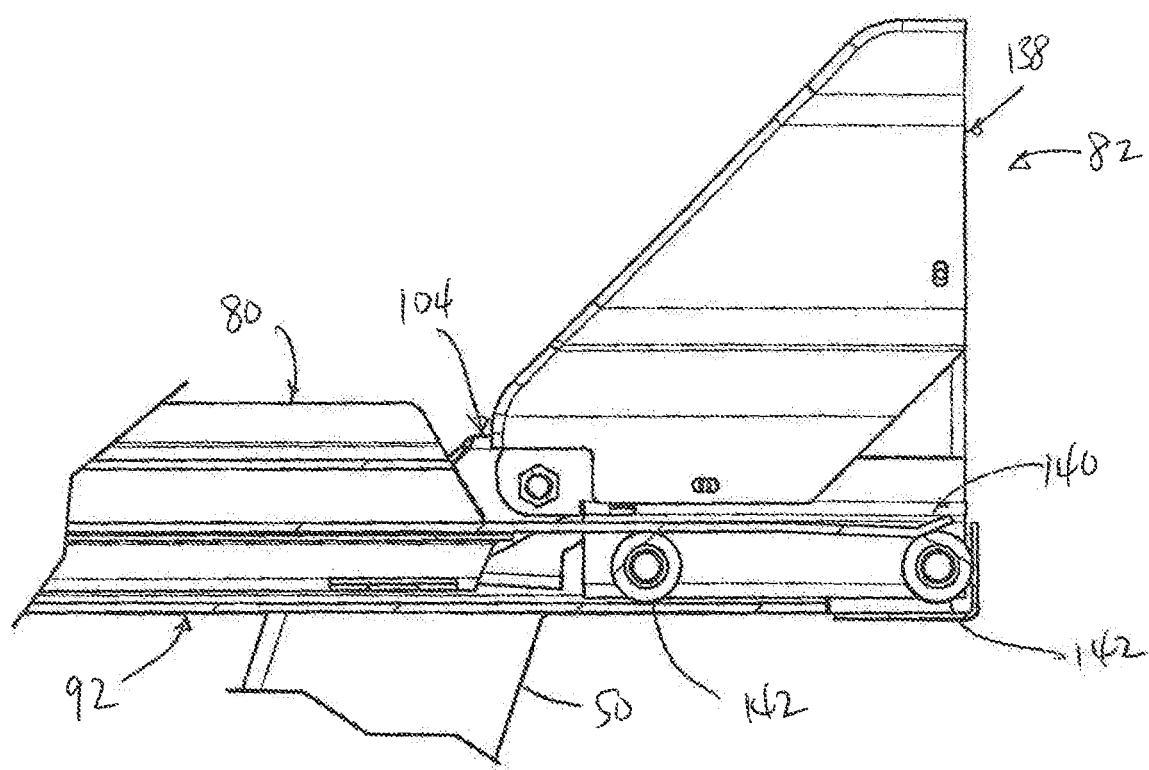
FIGS. 12 and 13 are additional partial side elevation views of the trolley assembly of FIGS. 11 and 12.
Figure 13:
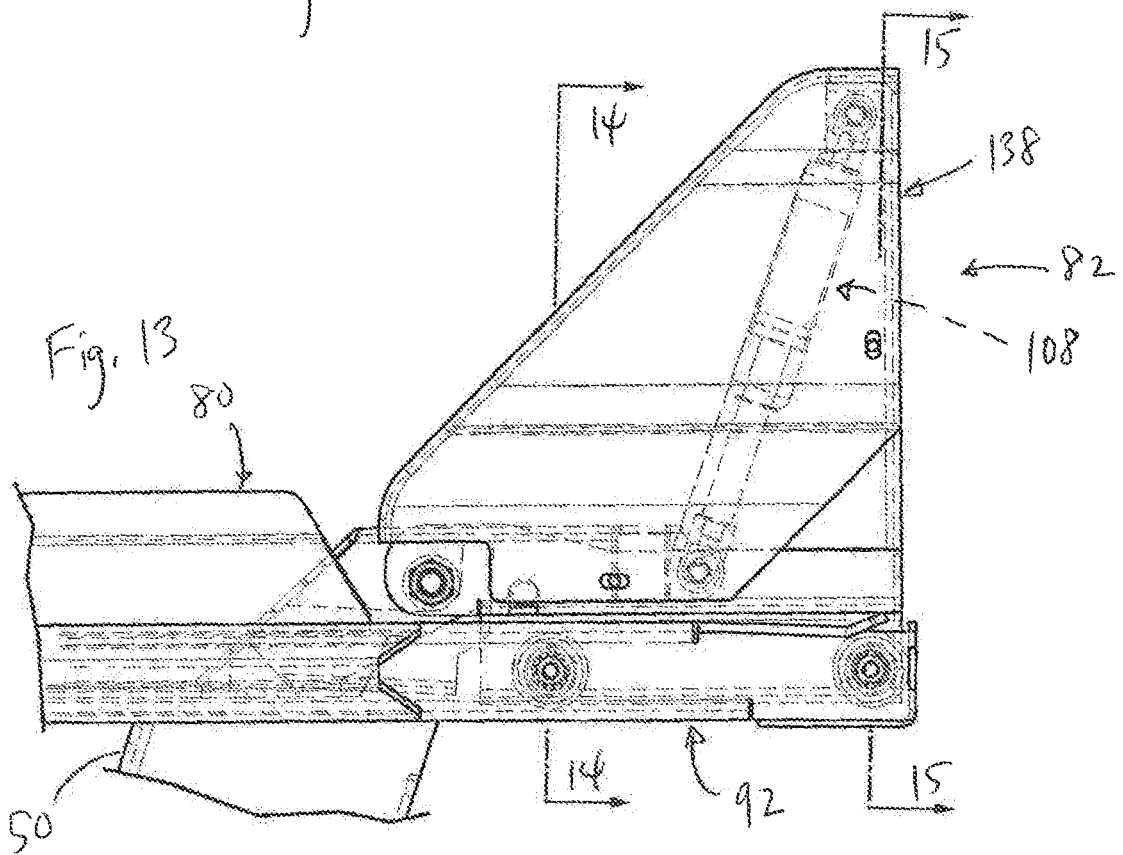
Figure 14:
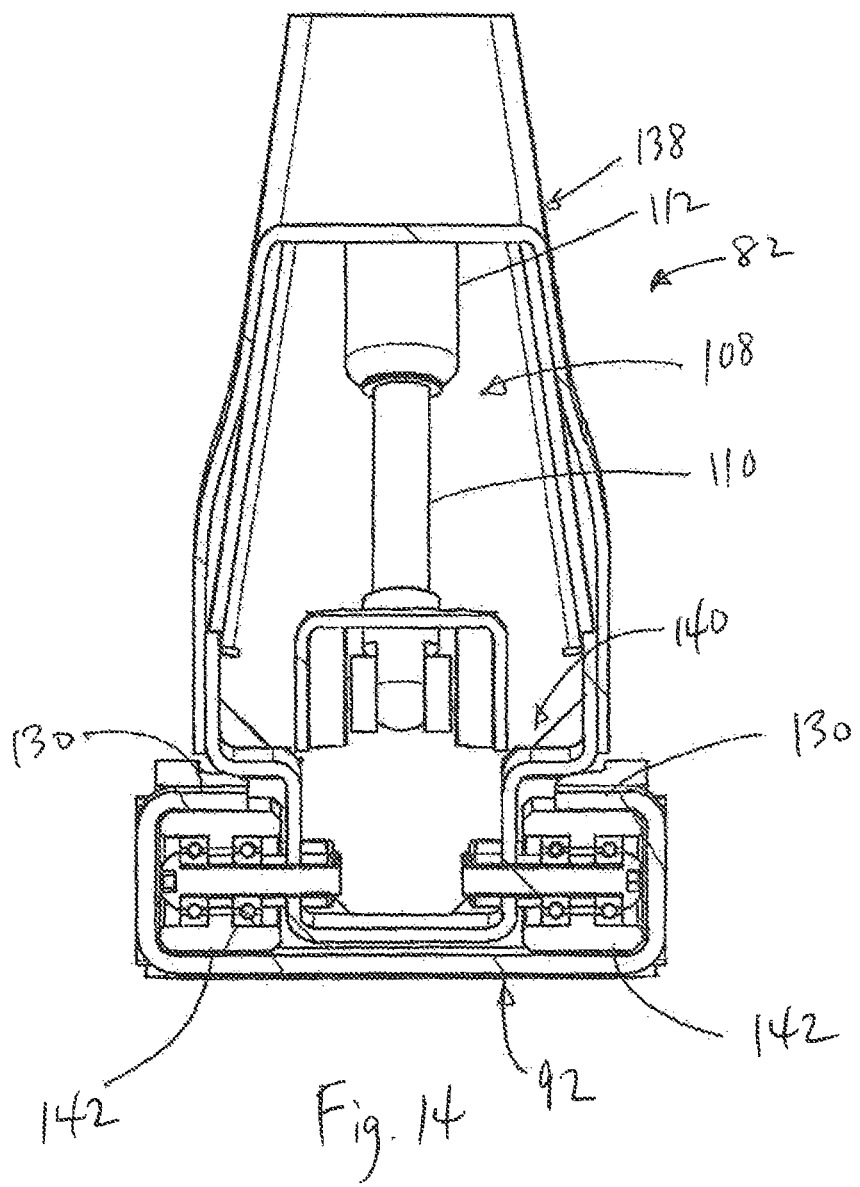
FIG. 14 is a section view taken along line 14-14 of FIG. 13.
Figure 15:
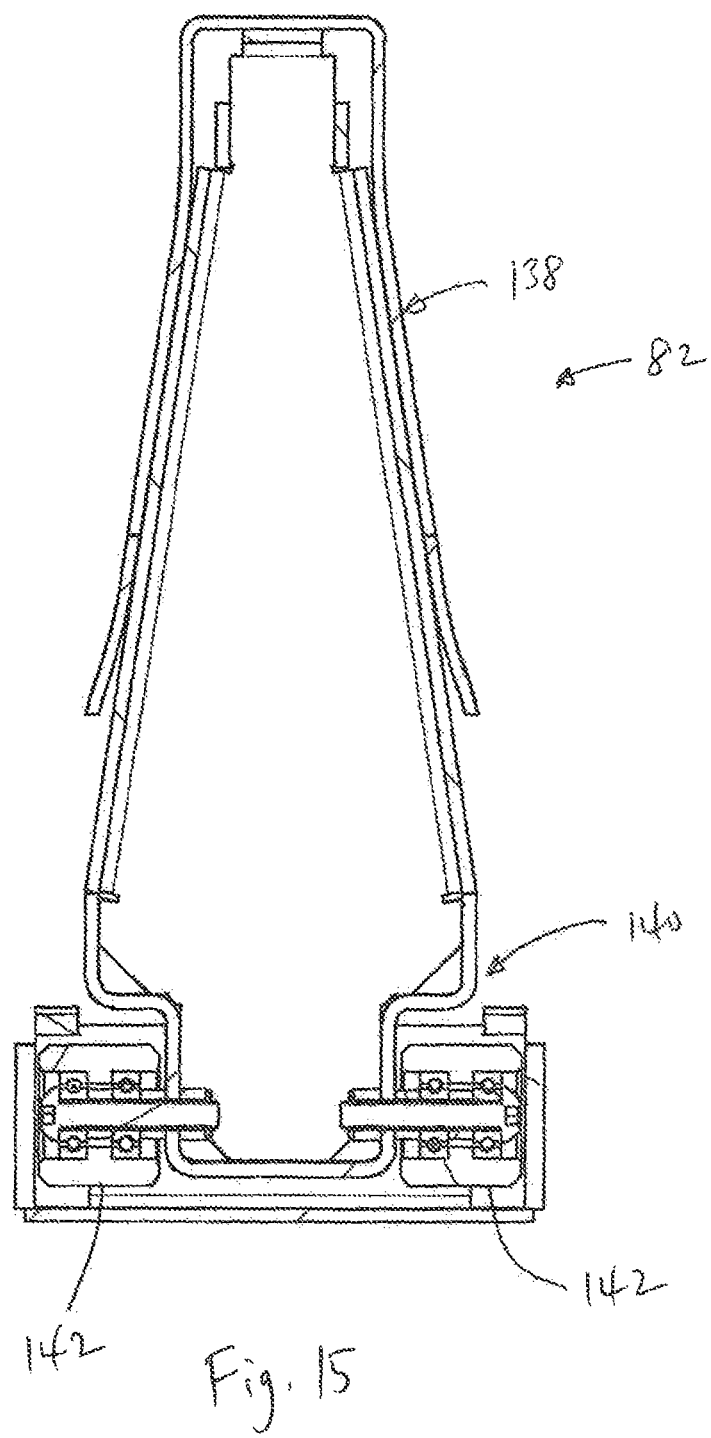
FIG. 15 is a section view taken along line 15-15 of FIG. 13.
Figure 16:
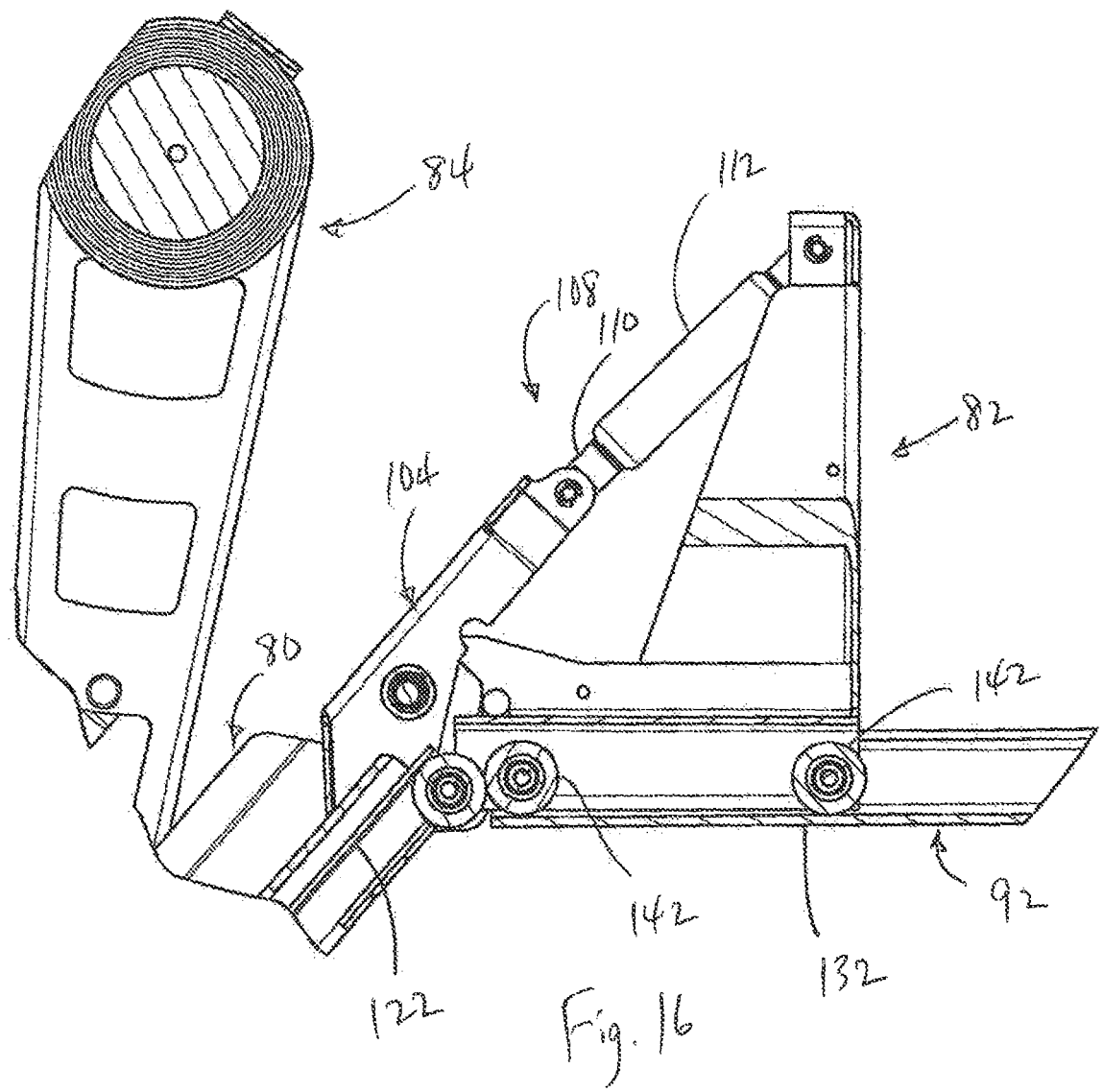
FIG. 16 is a partial section view showing components of the trolley assembly of FIGS. 11-15 when the upper level parking station components are in a bicycle loading or engaging position.
Figure 17:
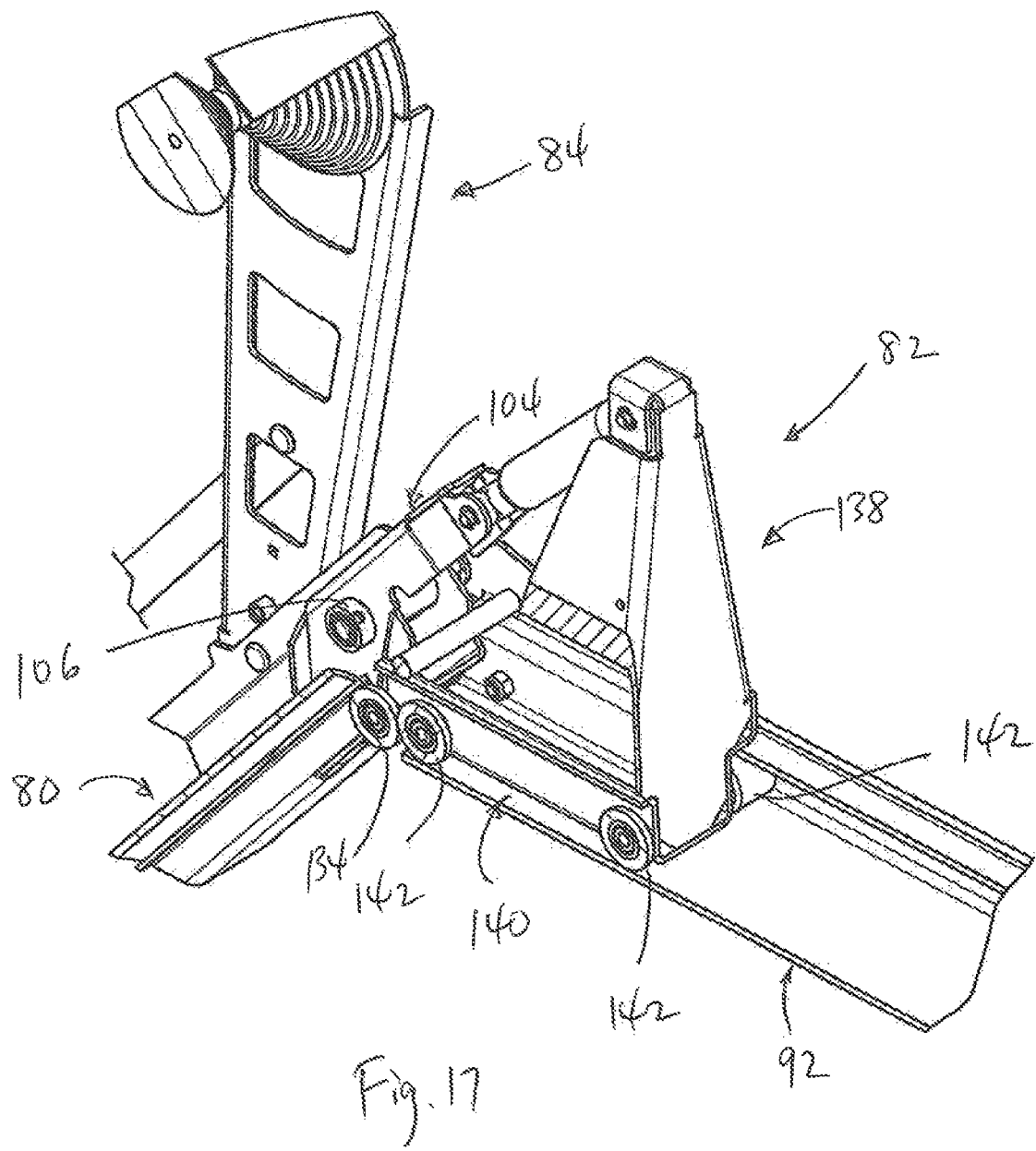
FIGS. 17 and 18 are partial isometric views of the components of the trolley assembly as in FIG. 16.
Figure 18:
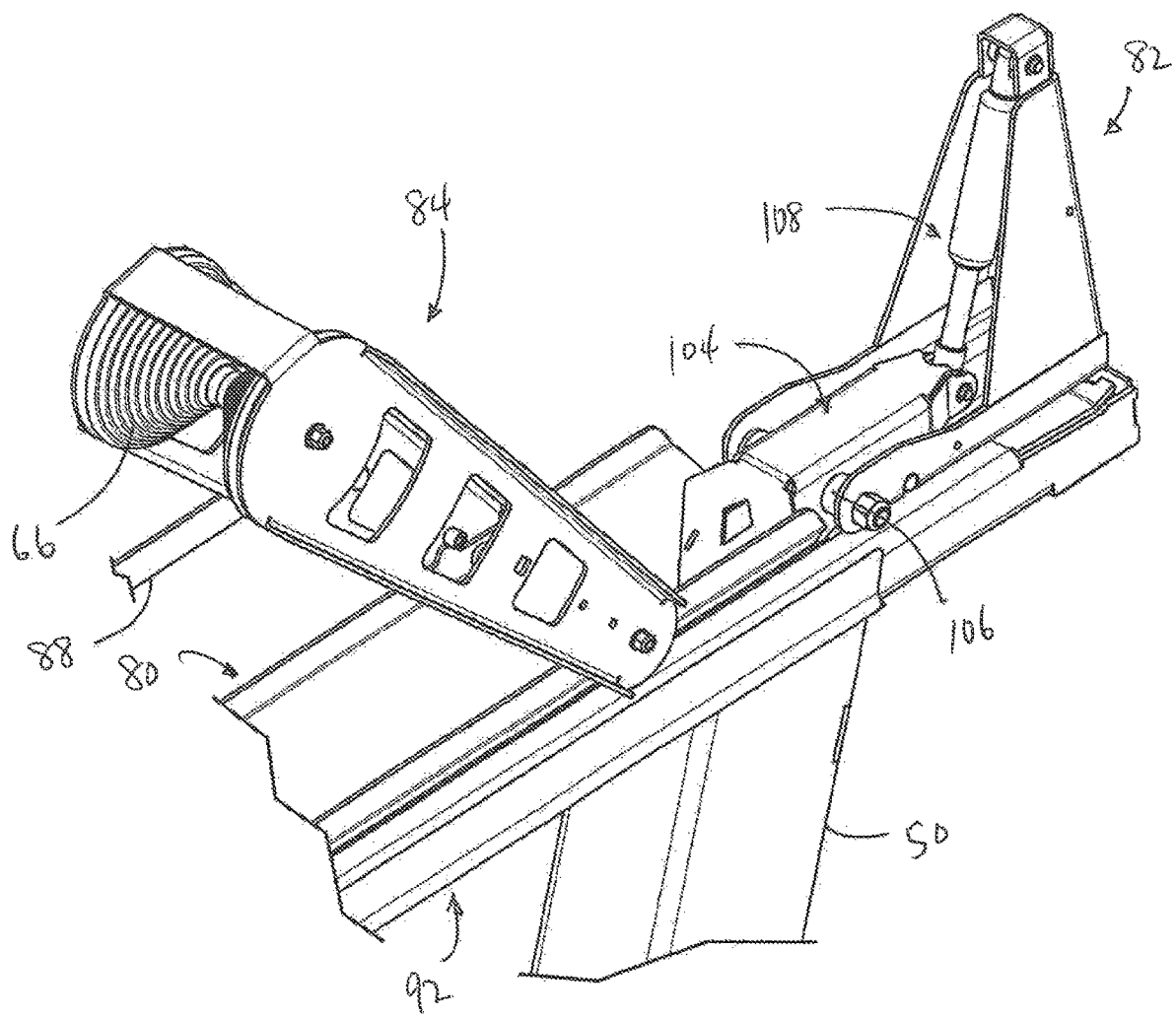
Figure 27:
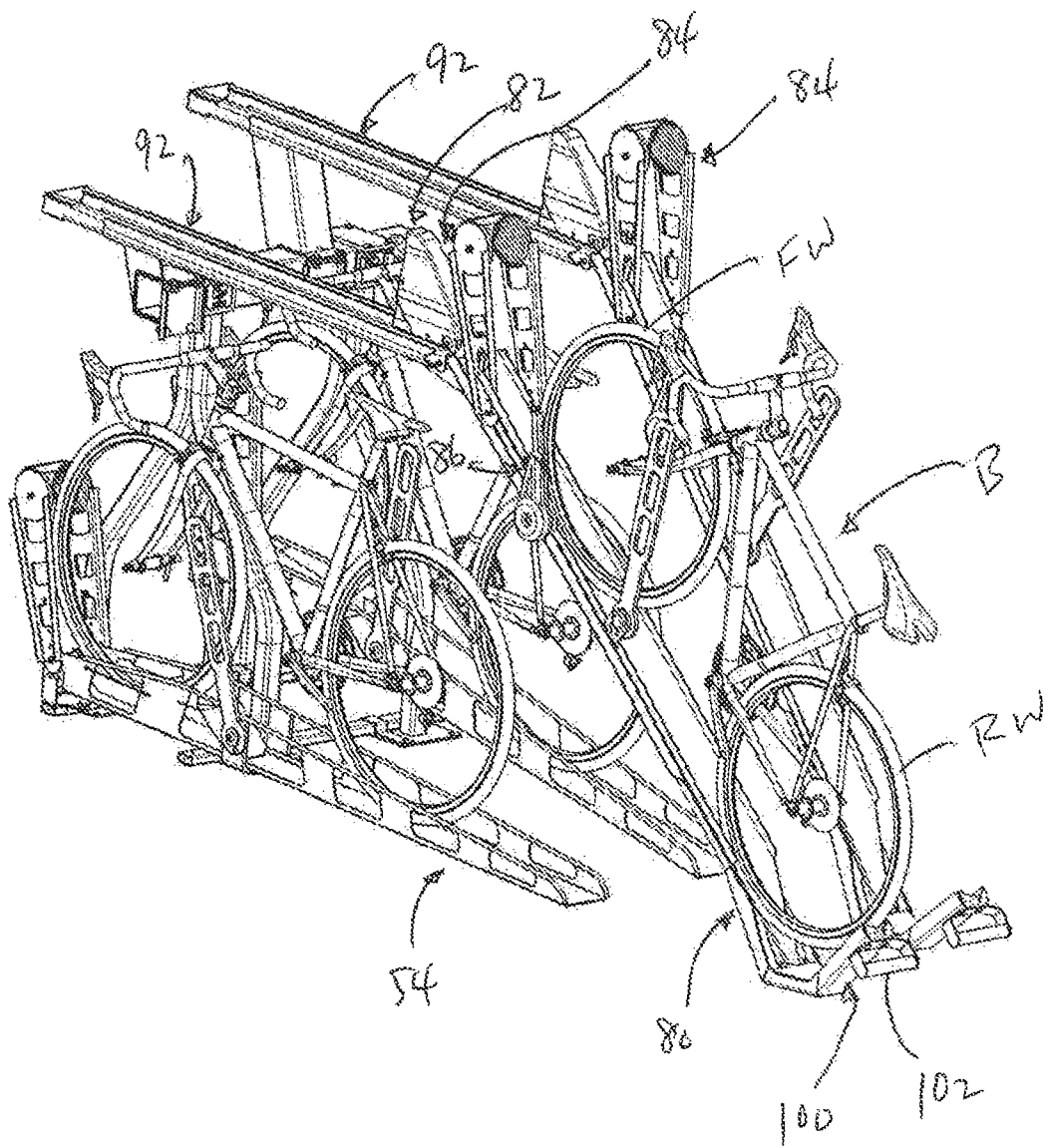
FIG. 27 is an isometric view illustrating the components of the upper level parking stations in a lowered, loading position.

In use, a user can park a bicycle B at an upper elevation by grasping handle 102 of one of the upper trays 80 that is in a forward or storage position, as shown in FIGS. 8 and 9. The user can apply a rearward force on the handle 102 to move the tray 80 rearwardly, which causes the connected trolley 82 to move rearwardly along the track 92 and movement of the carrier flanges 122 on the rollers 134. When the trolley 82 reaches a rearwardmost position on track 92 as shown in FIG. 11, the carrier flanges 122 clear the rollers 134 and the tray 80 and carrier member 116 can be pivoted downwardly about pivot shaft 106. Such downward pivoting movement of tray 80 and carrier member 116 continues until the rear end of tray 80 comes into contact with the ground or other supporting surface. During such lowering of the rear end of upper tray 80, the rod 110 of gas spring cylinder assembly 108 is moved toward a retracted position within cylinder 112 as shown in FIG. 11, which provides a degree of resistance to the downward movement of the rear of upper tray 80 and thereby a "soft" lowering feature. As can be seen in FIG. 27, the area of tray 80 adjacent rear wheel engagement portion 100 may be configured so as to be generally horizontal when tray 80 is lowered, so that it can rest flat on the supporting surface when tray 80 is pivoted fully downwardly, at which tray 80 is in a loading position. The user can then roll a bicycle B onto upper tray 80 when upper tray 80 is in its loading position, as shown in FIGS. 27-30. This can be accomplished without having to lift the bicycle B by advancing the bicycle B toward and over the flat area of upper tray 80 that engages the ground when upper tray 80 is in the loading position. The flattened V-shape defined by upper tray 80 and rear wheel engagement portion 100 allows the user to roll the bicycle B over the lower horizontal area of upper tray 80 and onto upper tray 80 by slightly turning the front wheel FW of bicycle B as it is advanced toward and onto upper tray 80 over the horizontal lower area of upper tray 80. The user can then continue advancing the front wheel FW of the bicycle B upwardly on the upwardly sloping area of upper tray 80 and guiding the rear wheel RW of the bicycle B into the cradle area defined by the rear portion of upper tray 80 and rear wheel engagement portion 100. Once the rear wheel of bicycle B is advanced in this manner and supported from below by upper tray 80, the bicycle B is allowed to fall by gravity so that its rear area engages and is supported by rear wheel engagement portion 100 of upper tray 80 and the bottom point of the rear wheel RW comes into contact with and is supported by the bottom wall 96 and sidewalls 94 of tray 80 located forwardly thereof. The rear wheel engagement portion 100 may be provided with divergent walls 101 toward its upper end, which enable the rear wheel RW to be nestled into engagement with the rear wheel engagement portion 100 and maintain the rear wheel RW centered. The front wheel FW of the bicycle B is positioned such that the bottom point of the front wheel FW comes into contact with and is supported by the bottom wall 96 and sidewalls 94 of tray 80 at a location between rear wheel RW and the front end of tray 80.

Figure 28:
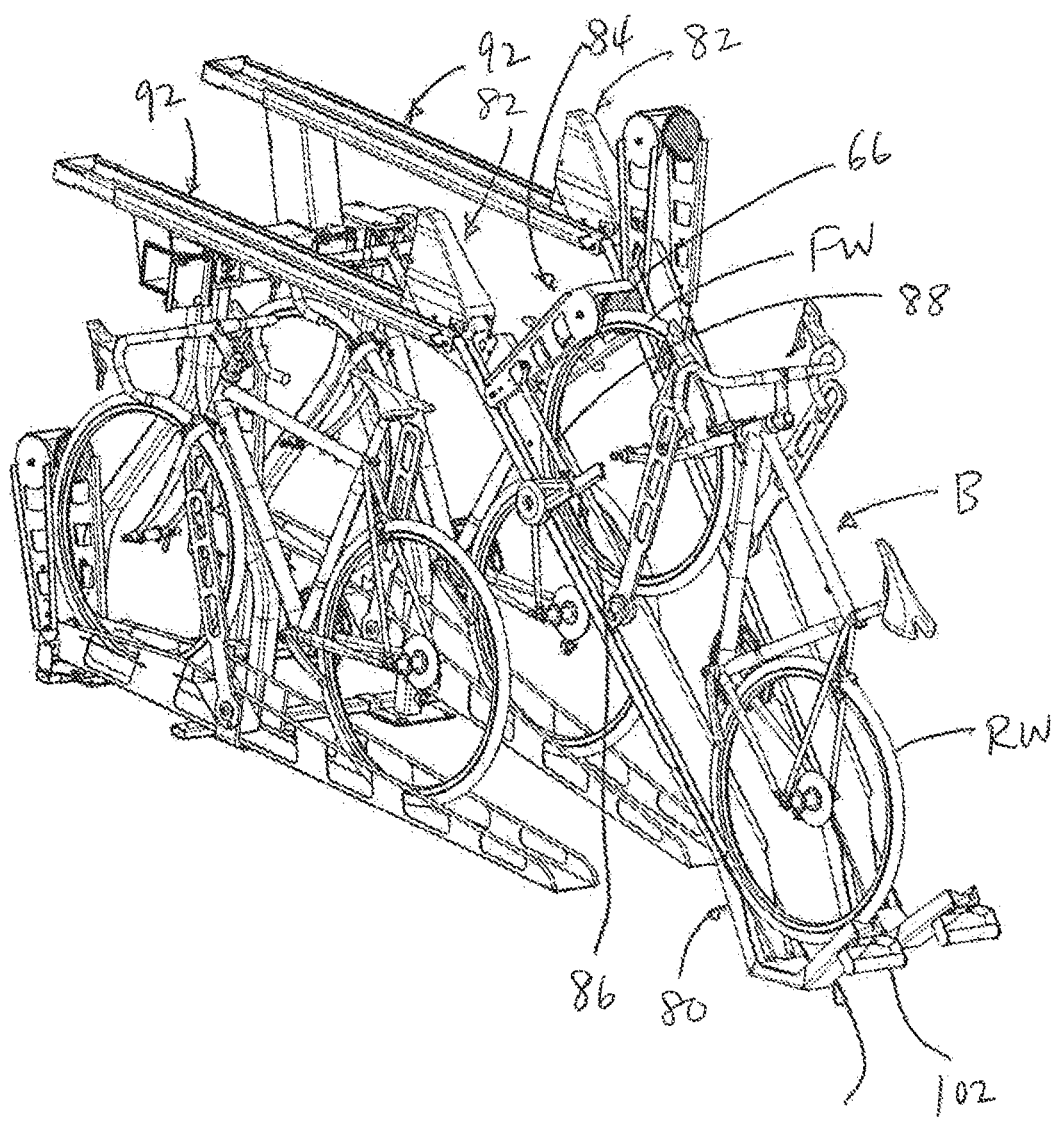
FIG. 28 is a partial isometric view similar to FIG. 27, illustrating the components of one of the upper level parking station in a bicycle engaging position.
Figure 29:
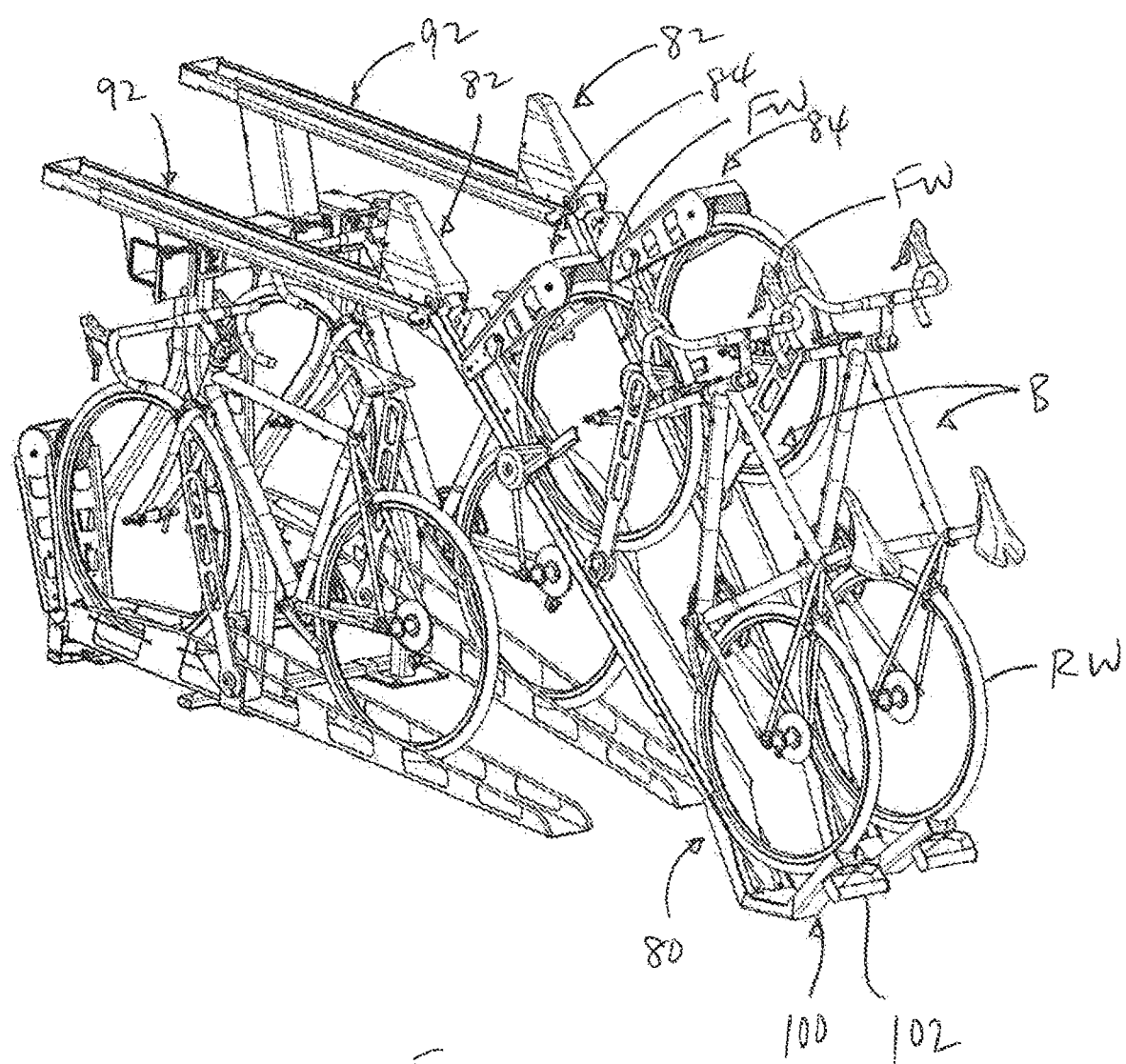
FIG. 29 is an isometric view similar to FIGS. 27 and 28, showing the components of both upper level parking stations in the bicycle engaging position.

Once bicycle B has been loaded onto tray 80 in this manner, the user can grasp the ratchet handle portion 146 of ratchet assembly 86 and pivot it rearwardly, as described above, which causes front wheel engagement arm 84 to pivot rearwardly via rearward movement of link 88. The user continues to pivot ratchet assembly 86 rearwardly until the engagement member 66 of the front wheel engagement arm 84 comes into contact with the tire of front wheel FW, as shown in FIG. 28. When this occurs, the user applies additional rearward force on the ratchet handle portion 146. Such additional rearward force on ratchet handle portion 146 first ensures that the bicycle B is in a fully rearward position on the tray 80 such that the tire of its rear wheel RW is fully engaged with rear wheel engagement portion 100 of tray 80. With the tire of rear wheel RW fully engaged with rear wheel engagement portion 100, additional rearward force applied to ratchet handle portion 146 causes engagement member 66 to slightly compress both the tire of front wheel FW and the tire of rear wheel RW. When this occurs, the bicycle B is vertically supported from below by tray 80, horizontally clamped thereabove by rear wheel engagement portion 100 and front wheel engagement arm 84, and laterally prevented from movement by the hourglass configuration of front wheel engagement member 66 and the divergent walls 101 on rear wheel engagement portion 100. This process can be repeated with the adjacent upper bicycle support assemblies 42, as shown in FIG. 29.

Figure 30:
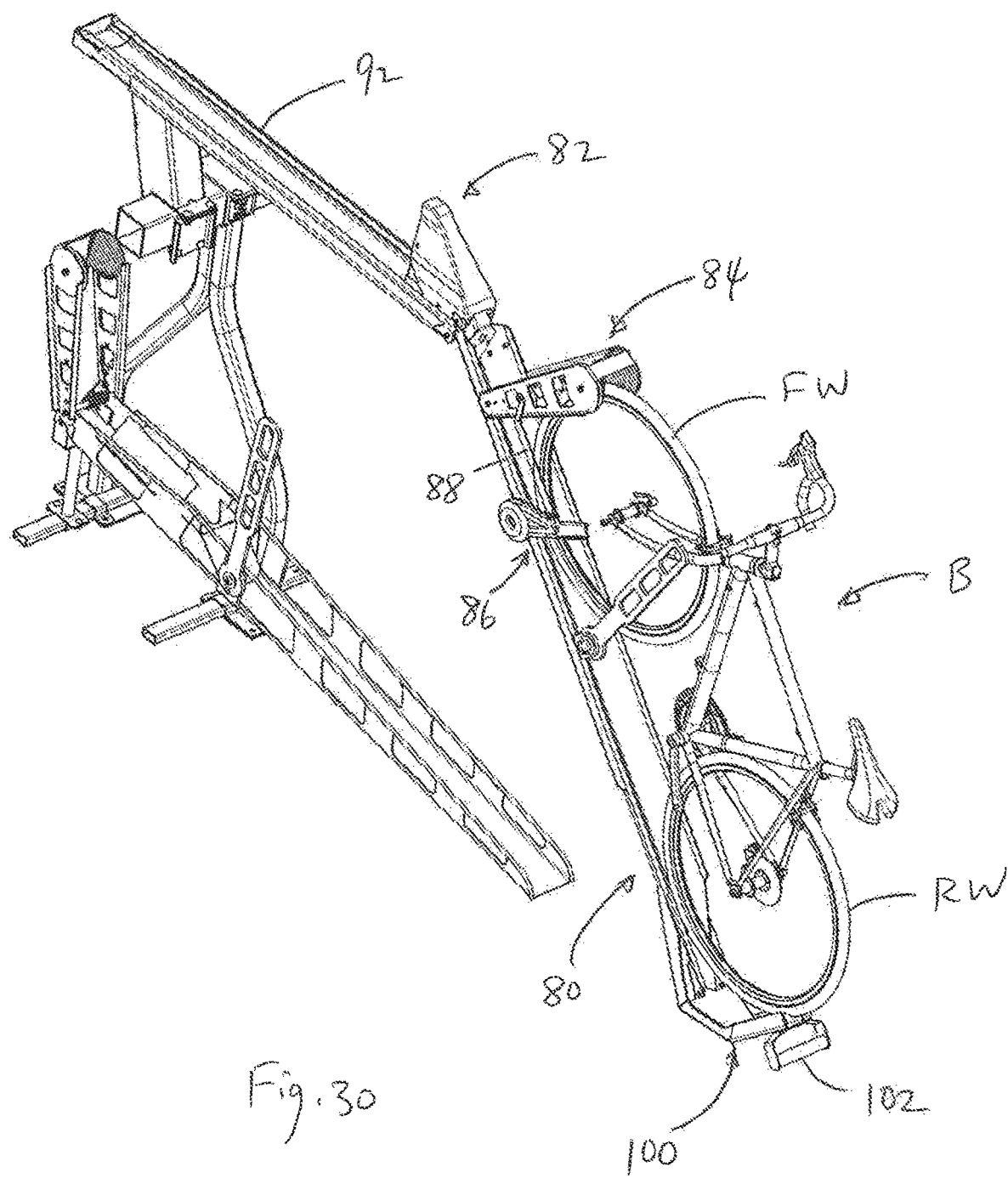
FIG. 30 is an isometric view similar to FIGS. 27-29, showing the second upper level parking station in the bicycle engaging position.
Figure 31:
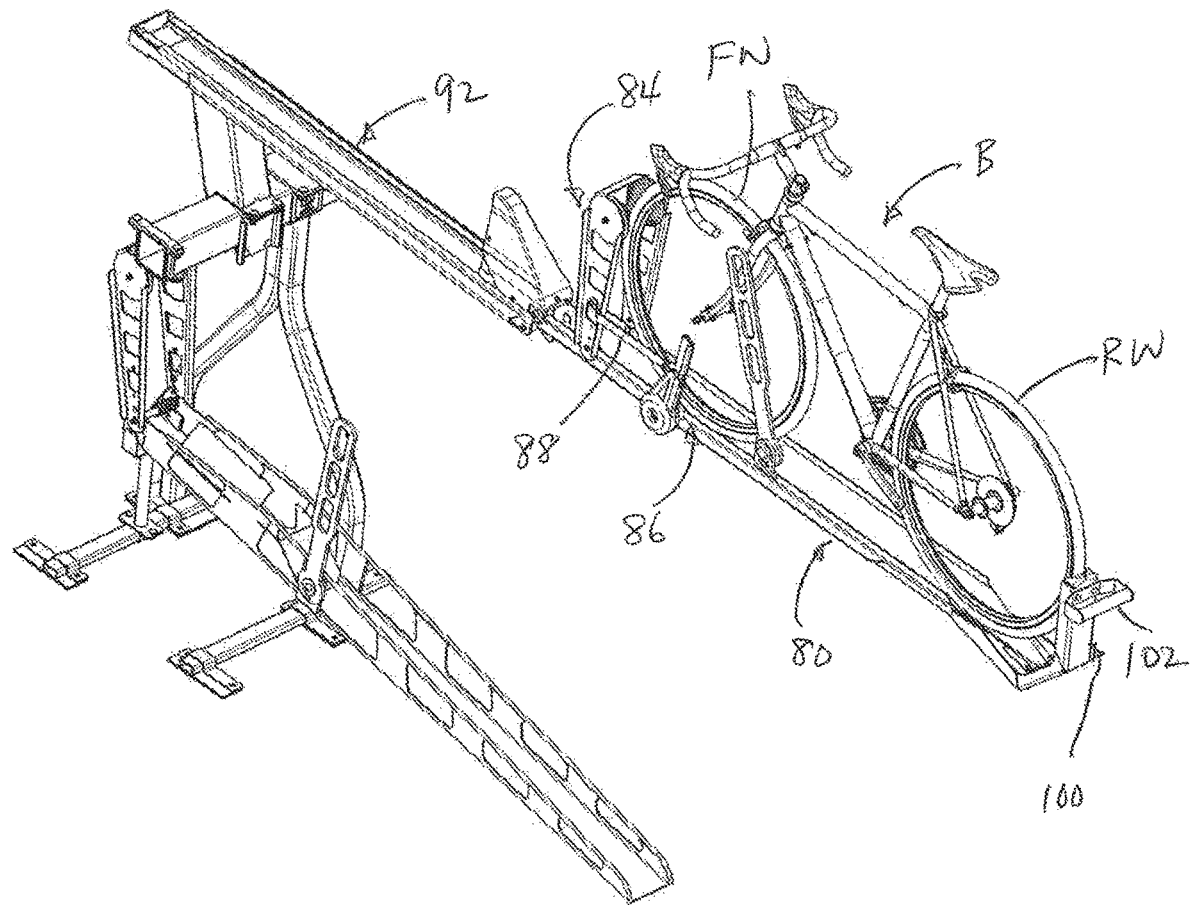
FIG. 31 is a partial isometric view similar to FIG. 30, showing the components of the second upper level parking station in a raised position.
Figure 32:
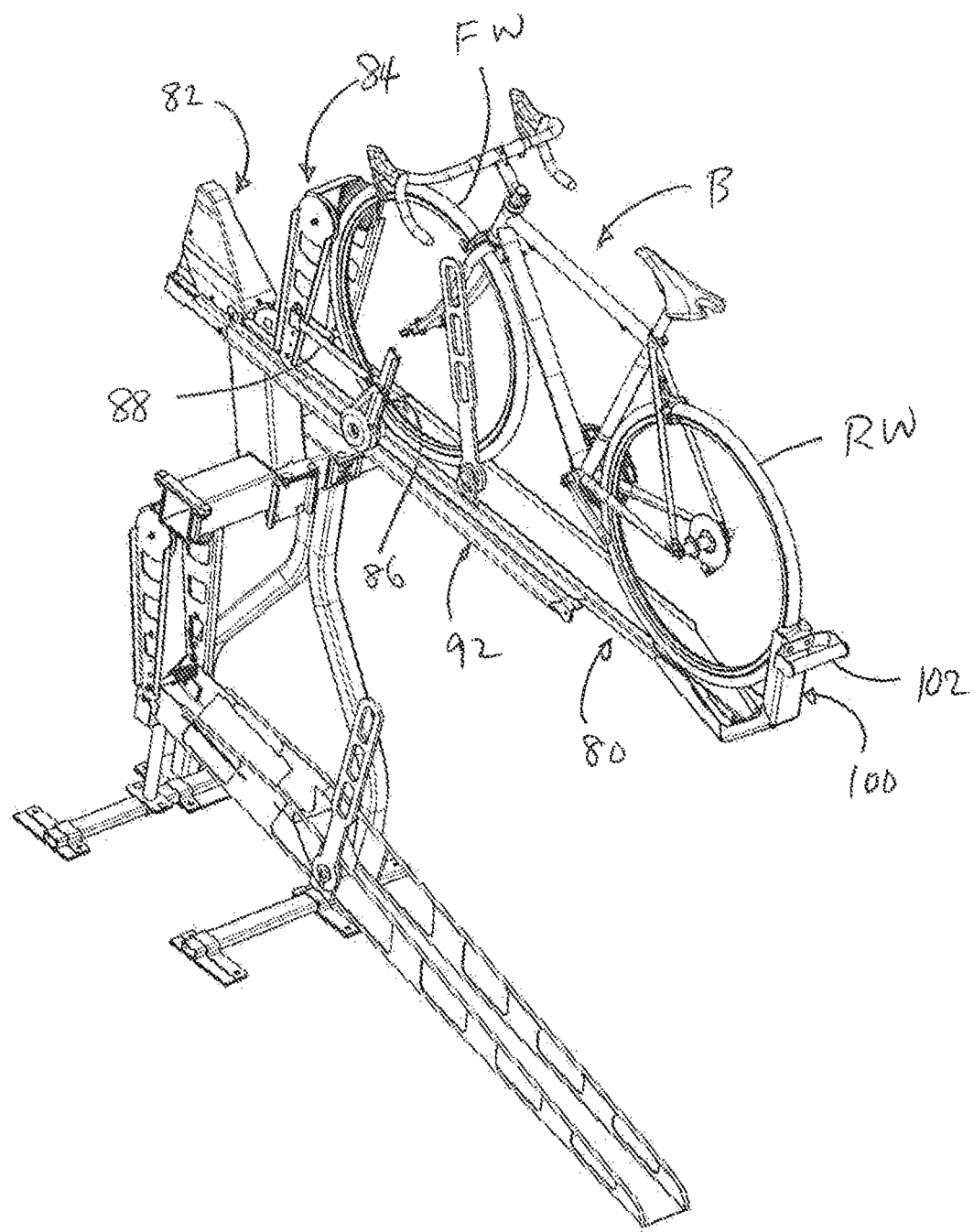
FIG. 32 is an isometric view similar to FIGS. 30 and 31, showing the components of the second upper level parking station in a storage position.
Figure 33:
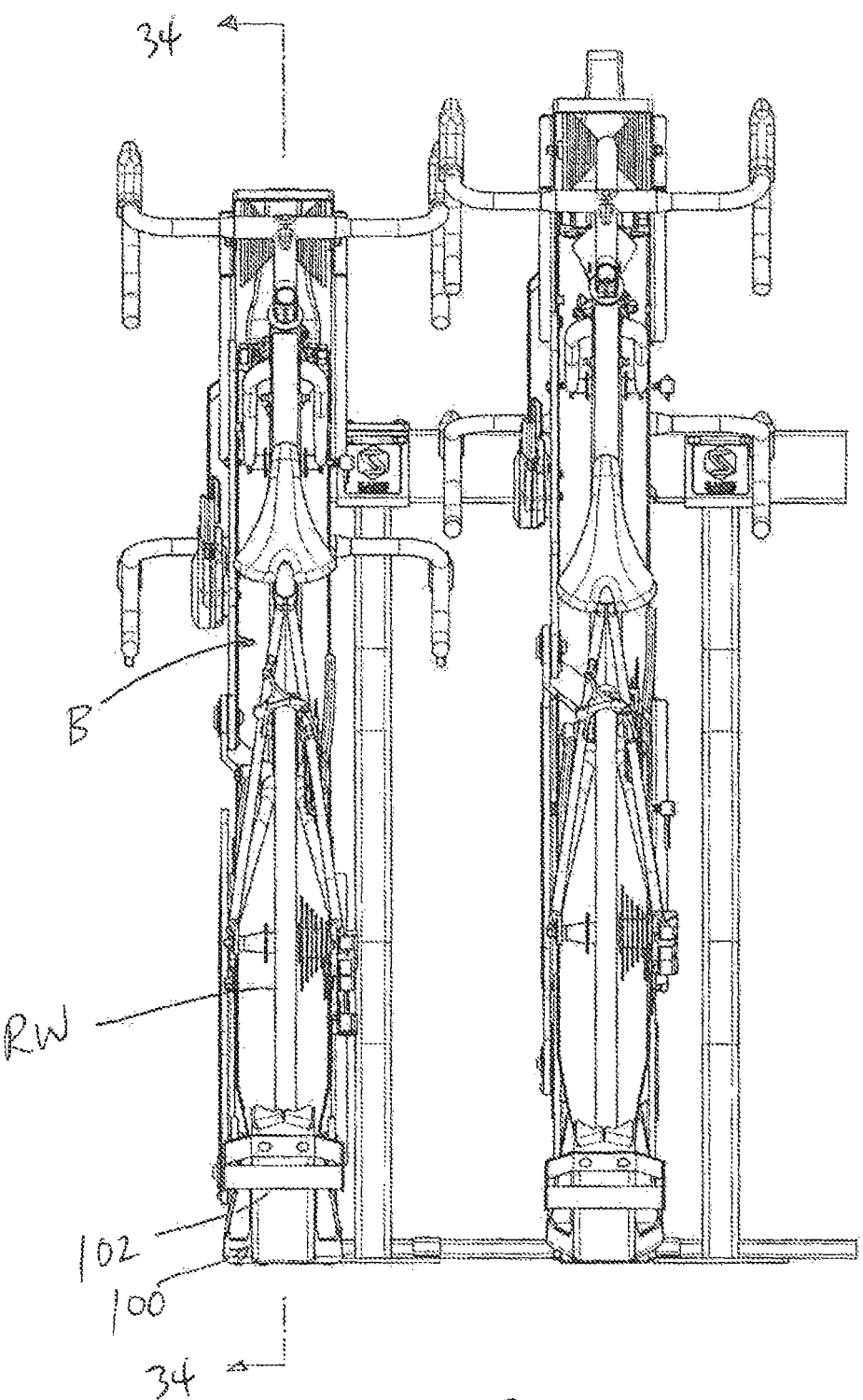
FIG. 33 is a rear end elevation view of the dual level bicycle parking or storage rack section of FIG. 1 with the components of the first and second upper level parking stations in the bicycle engaging position as an FIG. 29.

With a bicycle B fully supported on upper tray 80 in this manner, as shown in FIG. 30, the user is then able to grasp the handle 102 and lift upwardly, to pivot the front of upper tray 80 about pivot shaft 106 and place the upper tray 80 in a generally horizontal position parallel to track 92, as shown in FIG. 31. Such upward movement of the forward end of upper tray 80 is assisted by a biasing force applied by rod 110 of gas spring cylinder assembly 108 on extension arm 104 as rod 110 is moved toward its extended position relative to cylinder 112, as previously shown and described. Once upper tray 80 is raised to a generally horizontal position in this manner, the user applies a forwardly directed force on upper tray 80 via handle 102, which applies a forward pushing force on trolley 82 to advance it rearwardly on track 92. The user continues applying the forward pushing force on upper tray 80 via handle 102 until trolley 82 reaches its fully forward position, as shown in FIG. 32. With trolley 82 in its fully forward position, the upper tray 80 is fully supported from below and the supported bicycle B carried by upper tray 80 is securely retained in an elevated position. The above-described steps are reversed in order to lower the bicycle B and remove it from the upper tray 80 for use.

The components of the upper and lower bicycle parking stations are constructed and configured to accommodate a wide variety of bicycle styles and sizes. With respect to each lower bicycle parking station, which is configured to support a bicycle via engagement with the front bicycle wheel, the engagement arm and wheel engagement structure can receive and secure all currently available bicycle wheel diameters and tire widths. With respect to the upper bicycle parking station, which is configured to support a bicycle via engagement at the rear with a bicycle rear wheel and at the front with a bicycle front wheel, the rear wheel engagement structure and the front wheel engagement arm are configured to receive and secure all currently available bicycle wheel bases, wheel diameters, and tire widths. In this manner, a bicycle of any available size and style can be supported at either an upper bicycle parking station or a lower bicycle parking station.

It should be understood that the above description, while indicating representative embodiments of the present invention, is given by way of illustration and not of limitation. Many changes and modifications may be made within the scope of the present invention without departing from the spirit thereof, and the invention includes all such modifications.

Various additions, modifications, and rearrangements are contemplated as being within the scope of the following claims, which particularly point out and distinctly claim the subject matter regarding as the invention, and it is intended that the following claims cover all such additions, modifications, and rearrangements.

We claim:

1. A bicycle parking system, comprising:
    a support frame configured to be stationarily fixed to a stationary supporting surface; and
    a plurality of bicycle parking arrangements interconnected with the support frame for supporting bicycles on the frame, wherein each bicycle parking arrangement comprises:
        a tray configured to underlie both a first wheel and a second wheel of a bicycle, wherein the tray is configured such that the first and second bicycle wheels are aligned when supported from below by the tray;
        a fixed-position wheel engagement structure associated with the tray in a first location, wherein the fixed-position wheel engagement structure is arranged to engage an outer area of the first bicycle wheel;
        a movable wheel engagement member associated with the tray in a second location spaced from the first location, wherein the movable wheel engagement member is movable between a disengaged position and an engaged position, wherein in the disengaged position the movable wheel engagement member is spaced from an outer area of the second bicycle wheel and in the engaged position is arranged to engage the outer area of the second bicycle wheel, wherein the movable wheel engagement member comprises a wheel engagement arm pivotably mounted for movement about a pivot axis; and
        an actuator mechanism pivotably mounted to the tray at a location spaced from the pivot axis and interconnected with the wheel engagement arm via an actuator link, for selectively moving the wheel engagement arm between the engaged position and the disengaged position;
        wherein the engagement of the movable wheel engagement member with the outer area of the second bicycle wheel in the engaged position while the fixed-position wheel engagement structure is engaged with the outer area of the first bicycle wheel functions to apply a clamping force on the first and second bicycle wheels between the fixed-position wheel engagement structure and the movable wheel engagement member in a direction aligned with the first and second bicycle wheels to maintain the first and second bicycle wheels, and therefore the bicycle, in an upright position.

2. The bicycle parking system of claim 1, wherein the frame supports a plurality of bicycles at an upper level and at a lower level, wherein each bicycle parking arrangement supports a bicycle at the upper level.

3. The bicycle parking system of claim 2, wherein each fixed-position wheel engagement structure is carried by the tray and is configured to engage a rear area of the rear bicycle wheel and wherein the movable wheel engagement member is carried by the tray and configured to engage a front area of the front bicycle wheel.

4. The bicycle parking system of claim 3, wherein each tray is movably interconnected with the frame for movement between an upper bicycle storage position and a lowered bicycle loading position.

5. The bicycle parking system of claim 4, wherein each tray is movably engaged with a track supported by the frame, for movement between an elevated forward position and an elevated rearward position, and wherein each tray is movable to the lowered bicycle loading position from the elevated rearward position.

6. The bicycle parking system of claim 5, wherein each tray is movably engaged with the track via a trolley that is movable on the track between a forward position and a rearward position, and wherein the tray is movable to the lowered bicycle loading position via a pivot connection between the trolley and a forward end defined by the tray.

7. The bicycle parking system of claim 6, further comprising a biasing arrangement interposed between the trolley and the forward end of the tray, wherein the biasing arrangement and the forward end of the tray are configured to resist movement of the tray from the elevated rearward position toward the lowered loading position, and to assist in moving the tray to the elevated rearward position from the lowered loading position.

8. The bicycle parking system of claim 1, wherein the actuator mechanism includes a ratchet arrangement for selectively maintaining the wheel engagement arm in the disengaged position.

9. The bicycle parking system of claim 8, wherein the actuator mechanism comprises a ratchet handle pivotably mounted to the tray, wherein pivoting movement of the ratchet handle is operable to move the wheel engagement member between the engaged position and the disengaged position, and wherein the ratchet mechanism is interconnected with the ratchet handle for selectively maintaining the ratchet handle in a position that maintains the wheel engagement member in the engaged position, and a release actuator carried by the ratchet handle for disengaging the ratchet mechanism and enabling movement of the ratchet handle to move the wheel engagement member to the disengaged position.

10. A bicycle parking system, comprising:
a frame that supports a plurality of bicycle parking arrangements including one or more upper bicycle parking arrangements, each of which includes an upper tray, and one of more lower bicycle parking arrangements, each of which includes a lower tray;
wherein each upper tray is configured to underlie both wheels of a bicycle;
a stationary wheel engagement structure carried by the upper tray, wherein the stationary wheel engagement structure is arranged to engage a rear area of the rear bicycle wheel; and
a movable wheel engagement member associated with the upper tray, wherein the movable wheel engagement member is arranged to engage a front area of the front bicycle wheel, wherein the movable wheel engagement member comprises a wheel engagement arm pivotably mounted to the upper tray, and an actuator mechanism interconnected with the wheel engagement arm for selectively moving the wheel engagement arm between an engaged position, in which the wheel engagement arm is engaged with the front bicycle wheel, and a disengaged position in which the wheel engagement arm is disengaged from the front bicycle wheel;
wherein the actuator mechanism comprises a ratchet arrangement carried by the upper tray and a link connected between the ratchet arrangement and the wheel engagement arm for moving the wheel engagement arm between the engaged position and the disengaged position in response to operation of the ratchet arrangement;
wherein the engagement of the movable wheel engagement member with the front area of the front bicycle wheel and engagement of the stationary wheel engagement structure with the rear area of the rear bicycle wheel functions to apply a clamping force on the front and rear bicycle wheels therebetween to maintain the bicycle in an upright position.

11. The bicycle parking arrangement of claim 10, wherein the ratchet arrangement comprises a ratchet handle pivotably mounted to the upper tray, wherein pivoting movement of the ratchet handle is operable to move the wheel engagement member between the engaged position and the disengaged position, a ratchet mechanism interconnected with the ratchet handle for selectively maintaining the ratchet handle in a position that maintains the wheel engagement member in the engaged position, and a release actuator carried by the ratchet handle for disengaging the ratchet mechanism and enabling movement of the ratchet handle to move the wheel engagement member to the disengaged position.

12. A bicycle parking system, comprising:
a frame configured to support a plurality of bicycles at an upper level and at a lower level; and
a plurality of upper bicycle parking arrangements interconnected with the frame for supporting bicycles at the upper level, wherein each upper bicycle parking arrangement comprises an upper tray configured to underlie both a front wheel and a rear wheel of a bicycle, wherein the upper tray is configured such that the front and rear bicycle wheels are aligned when supported from below by the upper tray; a stationary wheel engagement structure associated with the upper tray in a first location, wherein the stationary wheel engagement structure is configured to engage a rear area of the rear bicycle wheel; and a movable wheel engagement member associated with the upper tray in a second location spaced from the first location, wherein the movable wheel engagement member is movable between a disengaged position and an engaged position, wherein in the disengaged position the movable wheel engagement member is spaced from a front area of the front bicycle wheel and in the engaged position is arranged to engage the front area of the front bicycle wheel; wherein the engagement of the movable wheel engagement member with the front area of the front bicycle wheel in the engaged position while the stationary wheel engagement structure is engaged with the rear area of the rear bicycle wheel functions to apply a clamping force on the front and rear bicycle wheels between the stationary wheel engagement structure and the movable wheel engagement member in a direction aligned with the front and rear bicycle wheels to maintain the front and rear bicycle wheels, and therefore the bicycle, in an upright position; wherein the movable wheel engagement member comprises a wheel engagement arm pivotably mounted to the upper tray, and an actuator mechanism interconnected with the wheel engagement arm for selectively moving the wheel engagement arm between the engaged position and the disengaged position, wherein the actuator mechanism comprises a ratchet arrangement carried by the upper tray and a link connected between the ratchet arrangement and the wheel engagement arm for moving the wheel engagement arm between the engaged position and the disengaged position in response to operation of the ratchet arrangement.

13. The bicycle parking system of claim 12, wherein the ratchet arrangement comprises a ratchet handle pivotably mounted to the upper tray, wherein pivoting movement of the ratchet handle is operable to move the wheel engagement member between the engaged position and the disengaged position, a ratchet mechanism interconnected with the ratchet handle for selectively maintaining the ratchet handle in a position that maintains the wheel engagement member in the engaged position, and a release actuator carried by the ratchet handle for disengaging the ratchet mechanism and enabling movement of the ratchet handle to move the wheel engagement member to the disengaged position.

* * * * *